(12) United States Patent
Israel et al.

(10) Patent No.: US 9,114,339 B2
(45) Date of Patent: Aug. 25, 2015

(54) FORMED FILTER ELEMENT

(75) Inventors: Joseph Israel, St. Louis Park, MN (US);
Eugene F Dunn, III, Coon Rapids, MN (US); Jon D Joriman, Little Canada, MN (US); Jeremy T Exley, Eden Prairie, MN (US); Andrew Dallas, Lakeville, MN (US)

(73) Assignee: DONALDSON COMPANY, INC., Bloomington, MN (US)

( * ) Notice: Subject to any disclaimer, the term of this patent is extended or adjusted under 35 U.S.C. 154(b) by 0 days.

(21) Appl. No.: 13/616,559

(22) Filed: Sep. 14, 2012

(65) Prior Publication Data

US 2013/0008006 A1    Jan. 10, 2013

Related U.S. Application Data

(62) Division of application No. 12/036,022, filed on Feb. 22, 2008.

(60) Provisional application No. 60/903,179, filed on Feb. 23, 2007.

(51) Int. Cl.
*B01D 39/02* (2006.01)
*B01D 39/20* (2006.01)
*B01D 39/16* (2006.01)

(52) U.S. Cl.
CPC .......... *B01D 39/2024* (2013.01); *B01D 39/163* (2013.01); *B01D 39/1615* (2013.01);
(Continued)

(58) Field of Classification Search
CPC .................................................. B01D 39/1615
USPC ....................................................... 264/109
See application file for complete search history.

(56) References Cited

U.S. PATENT DOCUMENTS 2,764,602 A    9/1956 Ahlbrecht et al.
2,764,603 A    9/1956 Ahlbrecht et al.
(Continued)

FOREIGN PATENT DOCUMENTS

DE    4344819    7/1994
EP    0340763    11/1989
(Continued)

OTHER PUBLICATIONS

"2.2 The Fourdrinier", http://www.paper.org.uk/papertech/data/unit_03/2_mechanical_methods/2-2_fourdrinier . . . , (Sep. 24, 2007) (7 pgs).
(Continued)

*Primary Examiner* — Tony G Soohoo
*Assistant Examiner* — Peter Keyworth
(74) *Attorney, Agent, or Firm* — Mueting, Raasch & Gebhardt, P.A.

(57) ABSTRACT

A filter medium for use in filtering a mobile fluid made from at least a bicomponent fiber. Other fibers, particles, or other materials can also be entrained in the filter medium. The filter medium has a substantial thickness compared to filters of the prior art. The fiber length and diameter dimensions are selected to obtain desired filter characteristics including thickness, basis weight, pore size, filtration efficiency, pressure drop, burst strength, and manufacturing efficiency. Further, a multilayer filter medium can be provided with ease. Each layer can have a different composition, pore size, basis weight, and so forth, thus providing the ability to build multiple functionality into the filter media of the invention.

39 Claims, 14 Drawing Sheets

(52) U.S. Cl.
CPC ........ B01D39/2048 (2013.01); B01D 39/2058 (2013.01); B01D 39/2062 (2013.01); B01D 39/2065 (2013.01); B01D 39/2089 (2013.01); B01D 2239/025 (2013.01); B01D 2239/0216 (2013.01); B01D 2239/0407 (2013.01); B01D 2239/064 (2013.01); B01D 2239/086 (2013.01); B01D 2239/1225 (2013.01); B01D 2239/1233 (2013.01); B01D 2239/1241 (2013.01); Y10T 29/49826 (2015.01)

(56) References Cited

U.S. PATENT DOCUMENTS

| | | | |
|---|---|---|---|
| 2,801,706 | A | 8/1957 | Asker |
| 2,803,656 | A | 8/1957 | Ahlbrecht et al. |
| 3,073,735 | A | 1/1963 | Till et al. |
| 3,147,064 | A | 9/1964 | Brown et al. |
| 3,255,131 | A | 6/1966 | Ahlbrecht et al. |
| 3,279,151 | A | 10/1966 | Kauer et al. |
| 3,303,621 | A | 2/1967 | Hill |
| 3,450,755 | A | 6/1969 | Ahlbrecht et al. |
| 3,505,794 | A | 4/1970 | Nutter et al. |
| 3,589,956 | A | 6/1971 | Krantz et al. |
| 3,595,731 | A | 7/1971 | Davies et al. |
| 3,616,160 | A | 10/1971 | Wincklhofer et al. |
| 3,616,183 | A | 10/1971 | Brayford et al. |
| 3,620,819 | A | 11/1971 | Croce |
| 3,639,195 | A | 2/1972 | Sanders |
| 3,653,181 | A | 4/1972 | Becker |
| 3,705,480 | A | 12/1972 | Wireman |
| 3,714,763 | A | 2/1973 | Suzuki |
| 3,728,848 | A | 4/1973 | Vest, Jr. |
| 3,744,256 | A | 7/1973 | Cobb et al. |
| 3,891,417 | A | 6/1975 | Wade |
| 3,917,448 | A | 11/1975 | Wood et al. |
| 3,934,238 | A | 1/1976 | Pavlou |
| 3,937,860 | A | 2/1976 | Gusman et al. |
| 3,972,694 | A | 8/1976 | Head |
| 3,998,988 | A | 12/1976 | Shimomai et al. |
| 4,042,522 | A | 8/1977 | Falk |
| 4,045,350 | A | 8/1977 | Kupf et al. |
| 4,047,914 | A | 9/1977 | Hansen et al. |
| 4,069,158 | A | 1/1978 | Bertocchio et al. |
| 4,069,244 | A | 1/1978 | Mueller |
| 4,079,675 | A | 3/1978 | Beumel, Jr. |
| 4,088,726 | A | 5/1978 | Cumbers |
| 4,090,967 | A | 5/1978 | Falk |
| 4,102,785 | A | 7/1978 | Head et al. |
| 4,111,815 | A | 9/1978 | Walker et al. |
| 4,160,059 | A | 7/1979 | Samejima |
| 4,161,422 | A | 7/1979 | Lawson et al. |
| 4,161,590 | A | 7/1979 | Mueller |
| 4,161,602 | A | 7/1979 | Mueller |
| 4,169,754 | A | 10/1979 | Perrotta |
| 4,177,141 | A | 12/1979 | Nakamura et al. |
| 4,189,338 | A | 2/1980 | Ejima et al. |
| 4,210,540 | A | 7/1980 | Perrotta |
| 4,211,819 | A | 7/1980 | Kunimune et al. |
| 4,231,768 | A | 11/1980 | Seibert et al. |
| 4,234,655 | A | 11/1980 | Kunimune et al. |
| 4,239,278 | A | 12/1980 | Skilliter, Jr. |
| 4,239,516 | A | 12/1980 | Klein |
| 4,254,731 | A | 3/1981 | Taylor |
| 4,267,016 | A | 5/1981 | Okazaki et al. |
| 4,269,888 | A | 5/1981 | Ejima et al. |
| 4,272,318 | A | 6/1981 | Walker et al. |
| 4,274,914 | A | 6/1981 | Keith et al. |
| 4,309,475 | A | 1/1982 | Hoffman, Jr. |
| 4,318,774 | A | 3/1982 | Powell et al. |
| 4,321,108 | A | 3/1982 | Goddard et al. |
| 4,327,936 | A | 5/1982 | Sekiguchi |
| 4,370,152 | A | 1/1983 | Luper |
| 4,388,086 | A | 6/1983 | Bauer et al. |
| 4,423,995 | A | 1/1984 | Karis |
| 4,429,001 | A | 1/1984 | Kolpin et al. |
| 4,443,233 | A | 4/1984 | Moran |
| 4,457,974 | A | 7/1984 | Summers |
| 4,487,617 | A | 12/1984 | Dienes et al. |
| 4,500,384 | A | 2/1985 | Tomioka et al. |
| 4,501,598 | A | 2/1985 | Long |
| RE31,849 | E | 3/1985 | Klein |
| 4,504,289 | A | 3/1985 | Waller et al. |
| 4,536,440 | A | 8/1985 | Berg |
| 4,545,789 | A | 10/1985 | Lato |
| 4,548,624 | A | 10/1985 | Waller |
| 4,551,378 | A | 11/1985 | Carey, Jr. |
| 4,552,603 | A | 11/1985 | Harris, Jr. et al. |
| 4,555,430 | A | 11/1985 | Mays |
| 4,579,774 | A | 4/1986 | Kuwazuru et al. |
| 4,597,218 | A | 7/1986 | Friemel et al. |
| 4,604,205 | A | 8/1986 | Ayers |
| 4,610,678 | A | 9/1986 | Weisman et al. |
| 4,627,863 | A | 12/1986 | Klein |
| 4,657,804 | A | 4/1987 | Mays et al. |
| 4,659,467 | A | 4/1987 | Spearman |
| 4,661,132 | A | 4/1987 | Thornton et al. |
| 4,676,807 | A | 6/1987 | Miller et al. |
| 4,677,929 | A | 7/1987 | Harris |
| 4,681,801 | A | 7/1987 | Eian et al. |
| 4,684,576 | A | 8/1987 | Tabor et al. |
| 4,688,511 | A | 8/1987 | Gerlach et al. |
| 4,689,057 | A | 8/1987 | Gasper |
| 4,713,285 | A | 12/1987 | Klein |
| 4,726,817 | A | 2/1988 | Roger |
| 4,729,371 | A | 3/1988 | Krueger et al. |
| 4,732,809 | A | 3/1988 | Harris, Jr. et al. |
| 4,734,208 | A | 3/1988 | Pall et al. |
| 4,764,189 | A | 8/1988 | Yanagawa et al. |
| 4,765,812 | A | 8/1988 | Homonoff et al. |
| 4,765,915 | A | 8/1988 | Diehl |
| 4,807,619 | A | 2/1989 | Dyrud et al. |
| 4,814,033 | A | 3/1989 | Spearman et al. |
| 4,816,224 | A | 3/1989 | Vogel et al. |
| 4,838,903 | A | 6/1989 | Thomaides et al. |
| 4,838,905 | A | 6/1989 | Billiet et al. |
| 4,840,838 | A | 6/1989 | Wyss |
| 4,868,032 | A | 9/1989 | Eian et al. |
| 4,874,666 | A | 10/1989 | Kubo et al. |
| 4,886,058 | A | 12/1989 | Brostrom et al. |
| 4,889,764 | A | 12/1989 | Chenoweth et al. |
| 4,904,385 | A | 2/1990 | Wessling et al. |
| 4,911,789 | A | 3/1990 | Rieunier et al. |
| 4,917,714 | A | 4/1990 | Kinsley, Jr. |
| 4,919,753 | A | 4/1990 | Johnson et al. |
| 4,933,129 | A | 6/1990 | Huykman |
| 4,983,434 | A | 1/1991 | Sassa |
| 5,022,964 | A | 6/1991 | Crane et al. |
| 5,027,781 | A | 7/1991 | Lewis |
| 5,034,040 | A | 7/1991 | Walcott et al. |
| 5,042,468 | A | 8/1991 | Lambert |
| 5,045,210 | A | 9/1991 | Chen et al. |
| 5,057,368 | A | 10/1991 | Largman et al. |
| 5,066,538 | E | 11/1991 | Huykman |
| 5,068,141 | A | 11/1991 | Kubo et al. |
| 5,080,791 | A | 1/1992 | Sims |
| 5,082,476 | A | 1/1992 | Kahlbaugh et al. |
| 5,087,278 | A | 2/1992 | Suzuki |
| 5,089,119 | A | 2/1992 | Day et al. |
| 5,092,911 | A | 3/1992 | Williams et al. |
| 5,104,537 | A | 4/1992 | Stifelman et al. |
| 5,108,827 | A | 4/1992 | Gessner |
| 5,110,330 | A | 5/1992 | Loughran |
| 5,131,387 | A | 7/1992 | French et al. |
| 5,147,553 | A | 9/1992 | Waite |
| 5,147,721 | A | 9/1992 | Baron et al. |
| 5,167,764 | A | 12/1992 | Nielsen et al. |
| 5,167,765 | A | 12/1992 | Nielsen et al. |
| 5,190,569 | A | 3/1993 | McGrath |
| 5,190,812 | A | 3/1993 | Joseph et al. |
| 5,208,098 | A | 5/1993 | Stover |
| 5,212,131 | A | 5/1993 | Belding |
| 5,246,474 | A | 9/1993 | Greatorex |
| 5,246,772 | A | 9/1993 | Manning |
| 5,275,743 | A | 1/1994 | Miller et al. |

(56) References Cited

U.S. PATENT DOCUMENTS

| | | |
|---|---|---|
| 5,283,106 A | 2/1994 | Seiler et al. |
| 5,284,704 A | 2/1994 | Kochesky et al. |
| 5,302,443 A | 4/1994 | Manning et al. |
| 5,307,796 A | 5/1994 | Kronzer et al. |
| 5,334,446 A | 8/1994 | Quantrille et al. |
| 5,336,286 A | 8/1994 | Alexander et al. |
| 5,354,603 A | 10/1994 | Erede et al. |
| 5,364,456 A | 11/1994 | Kahlbaugh et al. |
| 5,366,631 A | 11/1994 | Adiletta |
| 5,380,580 A | 1/1995 | Rogers et al. |
| 5,405,682 A | 4/1995 | Shawyer et al. |
| 5,415,676 A | 5/1995 | Tokar et al. |
| 5,436,980 A | 7/1995 | Weeks et al. |
| 5,454,945 A | 10/1995 | Spearman |
| 5,458,960 A | 10/1995 | Nieminen et al. |
| 5,468,572 A | 11/1995 | Zguris et al. |
| 5,472,467 A | 12/1995 | Pfeffer |
| 5,486,410 A | 1/1996 | Groeger et al. |
| 5,508,079 A | 4/1996 | Grant et al. |
| 5,508,093 A | 4/1996 | Mehdorn |
| 5,509,340 A | 4/1996 | Kawamura |
| 5,545,453 A | 8/1996 | Grant |
| 5,545,475 A | 8/1996 | Korleski |
| 5,575,832 A | 11/1996 | Boyd |
| 5,580,459 A | 12/1996 | Powers et al. |
| 5,581,647 A | 12/1996 | Onishi et al. |
| 5,584,784 A | 12/1996 | Wu |
| 5,597,645 A | 1/1997 | Pike et al. |
| 5,605,746 A | 2/1997 | Groeger et al. |
| 5,607,735 A | 3/1997 | Brown |
| 5,616,408 A | 4/1997 | Oleszczuk et al. |
| 5,620,641 A | 4/1997 | Berger |
| 5,620,785 A | 4/1997 | Watt et al. |
| 5,633,082 A | 5/1997 | Berger |
| 5,643,467 A | 7/1997 | Romanco |
| 5,643,653 A | 7/1997 | Griesbach, III et al. |
| 5,645,057 A | 7/1997 | Watt et al. |
| 5,645,689 A | 7/1997 | Ruf et al. |
| 5,645,690 A | 7/1997 | Cox, Jr. |
| 5,662,728 A | 9/1997 | Groeger |
| 5,665,235 A | 9/1997 | Gildersleeve et al. |
| 5,667,562 A | 9/1997 | Midkiff |
| 5,672,399 A | 9/1997 | Kahlbaugh et al. |
| 5,672,415 A | 9/1997 | Sawyer et al. |
| 5,677,058 A | 10/1997 | Neal et al. |
| 5,679,042 A | 10/1997 | Varona |
| 5,705,119 A | 1/1998 | Takeuchi et al. |
| 5,709,735 A | 1/1998 | Midkiff et al. |
| 5,711,878 A | 1/1998 | Ogata et al. |
| 5,721,180 A | 2/1998 | Pike et al. |
| 5,728,187 A | 3/1998 | Kern et al. |
| 5,728,298 A | 3/1998 | Hamlin |
| 5,753,002 A | 5/1998 | Glucksman |
| 5,755,963 A | 5/1998 | Sugiura et al. |
| 5,779,847 A | 7/1998 | Groeger |
| 5,783,505 A | 7/1998 | Duckett et al. |
| 5,785,725 A | 7/1998 | Cusick et al. |
| 5,792,711 A | 8/1998 | Roberts |
| 5,795,835 A | 8/1998 | Bruner et al. |
| 5,800,586 A | 9/1998 | Cusick et al. |
| 5,800,884 A | 9/1998 | D'Anna et al. |
| 5,804,286 A | 9/1998 | Quantrille et al. |
| 5,820,646 A | 10/1998 | Gillingham et al. |
| 5,837,627 A | 11/1998 | Halabisky et al. |
| 5,840,245 A | 11/1998 | Coombs et al. |
| 5,853,439 A | 12/1998 | Gieseke et al. |
| 5,885,390 A | 3/1999 | Alkire et al. |
| 5,911,213 A | 6/1999 | Ahlborn et al. |
| 5,932,104 A | 8/1999 | Kawamura |
| 5,935,879 A | 8/1999 | Helwig et al. |
| 5,935,883 A | 8/1999 | Pike |
| 5,948,344 A | 9/1999 | Cusick et al. |
| 5,952,252 A | 9/1999 | Shawver et al. |
| 5,954,962 A | 9/1999 | Adiletta |
| 5,965,468 A | 10/1999 | Marmon et al. |
| 5,972,166 A | 10/1999 | Helwig et al. |
| 5,972,477 A | 10/1999 | Kim et al. |
| 5,976,998 A | 11/1999 | Sandor et al. |
| 5,981,410 A | 11/1999 | Hansen et al. |
| 5,989,432 A | 11/1999 | Gildersleeve et al. |
| 5,989,688 A | 11/1999 | Barge et al. |
| 5,993,501 A | 11/1999 | Cusick et al. |
| 5,993,943 A | 11/1999 | Bodaghi et al. |
| 6,007,608 A | 12/1999 | Johnson |
| 6,007,898 A | 12/1999 | Kim et al. |
| 6,013,587 A | 1/2000 | Truong et al. |
| 6,024,782 A | 2/2000 | Freund et al. |
| 6,041,782 A | 3/2000 | Angadjivand et al. |
| 6,045,597 A | 4/2000 | Choi |
| 6,071,419 A | 6/2000 | Beier et al. |
| 6,071,641 A | 6/2000 | Zguris |
| 6,077,391 A | 6/2000 | Girondi |
| 6,099,726 A | 8/2000 | Gembolis et al. |
| 6,103,181 A | 8/2000 | Berger |
| 6,103,643 A | 8/2000 | Forsten |
| 6,110,249 A | 8/2000 | Medcalf et al. |
| 6,136,058 A | 10/2000 | Miller |
| 6,139,595 A | 10/2000 | Herman et al. |
| 6,143,049 A | 11/2000 | Gieseke et al. |
| 6,143,441 A | 11/2000 | Zguris et al. |
| 6,146,436 A | 11/2000 | Hollingsworth et al. |
| 6,152,120 A | 11/2000 | Julazadeh |
| 6,156,682 A | 12/2000 | Fletemier et al. |
| 6,156,842 A | 12/2000 | Hoenig et al. |
| 6,165,572 A | 12/2000 | Kahlbaugh et al. |
| 6,169,045 B1 | 1/2001 | Pike et al. |
| 6,171,355 B1 | 1/2001 | Gieseke et al. |
| 6,171,369 B1 | 1/2001 | Schultink et al. |
| 6,171,684 B1 | 1/2001 | Kahlbaugh et al. |
| 6,174,603 B1 | 1/2001 | Berger |
| 6,183,536 B1 | 2/2001 | Schultink et al. |
| 6,186,992 B1 | 2/2001 | Roe et al. |
| 6,187,073 B1 | 2/2001 | Gieseke et al. |
| 6,190,768 B1 | 2/2001 | Turley et al. |
| 6,197,709 B1 | 3/2001 | Tsai et al. |
| 6,200,669 B1 | 3/2001 | Marmon et al. |
| 6,203,713 B1 | 3/2001 | Tanny |
| 6,241,886 B1 | 6/2001 | Kitagawa et al. |
| 6,251,224 B1 | 6/2001 | Dong |
| 6,264,044 B1 | 7/2001 | Meyering |
| 6,267,252 B1 | 7/2001 | Amsler |
| 6,267,843 B1 | 7/2001 | Helwig et al. |
| 6,290,739 B1 | 9/2001 | Gieseke et al. |
| 6,300,261 B1 | 10/2001 | Young et al. |
| 6,301,887 B1 | 10/2001 | Gorel et al. |
| 6,306,539 B1 | 10/2001 | Zguris |
| 6,316,107 B1 | 11/2001 | Lubnin et al. |
| 6,330,883 B1 | 12/2001 | Berger |
| 6,351,078 B1 | 2/2002 | Wang et al. |
| 6,352,947 B1 | 3/2002 | Haley et al. |
| 6,355,076 B2 | 3/2002 | Gieseke et al. |
| 6,355,079 B1 | 3/2002 | Sorvari et al. |
| 6,364,976 B2 | 4/2002 | Fletemier et al. |
| 6,365,001 B1 | 4/2002 | Helwig et al. |
| 6,372,004 B1 | 4/2002 | Schultink et al. |
| 6,384,369 B1 | 5/2002 | Stenersen et al. |
| 6,406,789 B1 | 6/2002 | McDaniel et al. |
| 6,409,785 B1 | 6/2002 | Smithies et al. |
| 6,409,787 B1 | 6/2002 | Smithies et al. |
| 6,419,721 B1 | 7/2002 | Hunter |
| 6,419,839 B1 | 7/2002 | Cox et al. |
| 6,420,626 B1 | 7/2002 | Erspamer et al. |
| 6,428,610 B1 | 8/2002 | Tsai et al. |
| 6,440,192 B2 | 8/2002 | Guerin et al. |
| 6,458,456 B1 | 10/2002 | Zainiev et al. |
| 6,479,147 B2 | 11/2002 | Lubnin et al. |
| 6,488,811 B1 | 12/2002 | Dong |
| 6,495,286 B2 | 12/2002 | Zguris et al. |
| 6,503,447 B1 | 1/2003 | Mondjian et al. |
| 6,511,774 B1 | 1/2003 | Tsukuda et al. |
| 6,517,612 B1 | 2/2003 | Crouch et al. |
| 6,521,321 B2 | 2/2003 | Kahlbaugh et al. |
| 6,528,439 B1 | 3/2003 | Stokes et al. |
| 6,530,366 B2 | 3/2003 | Geiger et al. |

(56) References Cited

U.S. PATENT DOCUMENTS

| | | |
|---|---|---|
| 6,530,969 B2 | 3/2003 | Gieseke et al. |
| 6,540,801 B2 | 4/2003 | Gieseke et al. |
| 6,541,114 B2 | 4/2003 | Katou et al. |
| 6,547,860 B2 | 4/2003 | Buchwald et al. |
| 6,555,489 B1 | 4/2003 | Pfeffer |
| 6,576,034 B2 | 6/2003 | Berger |
| 6,607,997 B1 | 8/2003 | Cox et al. |
| 6,613,704 B1 | 9/2003 | Arnold et al. |
| 6,616,723 B2 | 9/2003 | Berger |
| 6,624,099 B1 | 9/2003 | Shah |
| H2086 H | 10/2003 | Amsler |
| 6,645,388 B2 | 11/2003 | Sheikh-Ali |
| 6,649,547 B1 | 11/2003 | Arnold et al. |
| 6,652,614 B2 | 11/2003 | Gieseke et al. |
| 6,653,381 B2 | 11/2003 | Thames et al. |
| 6,673,864 B2 | 1/2004 | Patel et al. |
| 6,682,576 B1 | 1/2004 | Kiyotani et al. |
| 6,682,809 B2 | 1/2004 | Van Rheenen |
| 6,695,148 B2 | 2/2004 | Homonoff et al. |
| 6,705,270 B1 | 3/2004 | Rau et al. |
| 6,706,086 B2 | 3/2004 | Emig et al. |
| 6,723,142 B2 | 4/2004 | Emerson et al. |
| 6,723,669 B1 | 4/2004 | Clark et al. |
| 6,740,142 B2 | 5/2004 | Buettner et al. |
| 6,743,273 B2 | 6/2004 | Chung et al. |
| 6,770,356 B2 | 8/2004 | O'Donnell et al. |
| 6,797,377 B1 | 9/2004 | DeLucia et al. |
| 6,815,383 B1 | 11/2004 | Arnold |
| 6,818,037 B2 | 11/2004 | Tanaka et al. |
| 6,821,321 B2 | 11/2004 | Chinn et al. |
| 6,821,672 B2 | 11/2004 | Zguris |
| 6,835,311 B2 | 12/2004 | Koslow |
| 6,848,866 B1 | 2/2005 | McGinn |
| 6,849,330 B1 | 2/2005 | Morin et al. |
| 6,858,057 B2 | 2/2005 | Healey |
| 6,860,917 B2 | 3/2005 | Henrichsen et al. |
| 6,866,692 B2 | 3/2005 | Emerson et al. |
| 6,872,431 B2 | 3/2005 | Kahlbaugh et al. |
| 6,872,674 B2 | 3/2005 | Williams et al. |
| 6,874,641 B2 | 4/2005 | Clary |
| 6,875,249 B2 | 4/2005 | Gogins |
| 6,878,191 B2 | 4/2005 | Escaffre et al. |
| 6,883,321 B2 | 4/2005 | Fornof |
| 6,916,752 B2 | 7/2005 | Berrigan et al. |
| 6,923,182 B2 | 8/2005 | Angadjivand et al. |
| 6,924,028 B2 | 8/2005 | Chung et al. |
| 6,926,961 B2 | 8/2005 | Roth |
| 6,936,554 B1 | 8/2005 | Singer |
| 6,939,386 B2 | 9/2005 | Sato et al. |
| 6,939,492 B2 | 9/2005 | Jackson et al. |
| 6,942,711 B2 | 9/2005 | Faulkner et al. |
| 6,955,708 B1 | 10/2005 | Julos et al. |
| 6,955,775 B2 | 10/2005 | Chung et al. |
| 6,966,940 B2 | 11/2005 | Krisko et al. |
| 6,991,113 B2 | 1/2006 | Nakajima |
| 7,008,144 B2 | 3/2006 | McGinn |
| 7,029,516 B2 | 4/2006 | Campbell et al. |
| 7,037,569 B2 | 5/2006 | Curro et al. |
| 7,049,254 B2 | 5/2006 | Bansal et al. |
| 7,070,640 B2 | 7/2006 | Chung et al. |
| 7,090,715 B2 | 8/2006 | Chung et al. |
| 7,094,270 B2 | 8/2006 | Schultink et al. |
| 7,115,150 B2 | 10/2006 | Johnson et al. |
| 7,125,470 B2 | 10/2006 | Graef et al. |
| 7,309,372 B2 | 12/2007 | Kahlbaugh et al. |
| 7,314,497 B2 | 1/2008 | Kahlbaugh et al. |
| 7,520,994 B2 | 4/2009 | Dong et al. |
| 7,985,344 B2 | 7/2011 | Dema et al. |
| 8,021,455 B2 | 9/2011 | Adamek et al. |
| 8,021,457 B2 | 9/2011 | Dema et al. |
| 8,057,567 B2 | 11/2011 | Webb et al. |
| 8,267,681 B2 | 9/2012 | Gupta et al. |
| 2001/0000375 A1 | 4/2001 | Kobayashi et al. |
| 2001/0004061 A1 | 6/2001 | Popoff et al. |
| 2002/0007167 A1 | 1/2002 | Dan et al. |
| 2002/0013111 A1 | 1/2002 | Dugan et al. |
| 2002/0083690 A1 | 7/2002 | Emig et al. |
| 2002/0116910 A1 | 8/2002 | Berger |
| 2002/0121194 A1 | 9/2002 | Buchwald et al. |
| 2002/0127939 A1 | 9/2002 | Hwo et al. |
| 2002/0193030 A1 | 12/2002 | Yao |
| 2003/0008214 A1 | 1/2003 | Zguris |
| 2003/0019193 A1 | 1/2003 | Chinn et al. |
| 2003/0022575 A1 | 1/2003 | Yoneda et al. |
| 2003/0039815 A1 | 2/2003 | Roth |
| 2003/0082979 A1 | 5/2003 | Bean et al. |
| 2003/0084788 A1 | 5/2003 | Fraser, Jr. |
| 2003/0087568 A1 | 5/2003 | Kinn et al. |
| 2003/0089092 A1 | 5/2003 | Bause et al. |
| 2003/0096549 A1 | 5/2003 | Ortega et al. |
| 2003/0106294 A1 | 6/2003 | Chung et al. |
| 2003/0109190 A1 | 6/2003 | Geel |
| 2003/0119406 A1 | 6/2003 | Abuto et al. |
| 2003/0139110 A1 | 7/2003 | Nagaoka et al. |
| 2003/0145569 A1 | 8/2003 | Sato et al. |
| 2003/0148691 A1 | 8/2003 | Pelham, Sr. et al. |
| 2003/0150820 A1 | 8/2003 | Dussaud et al. |
| 2003/0211799 A1 | 11/2003 | Yao et al. |
| 2004/0116026 A1 | 6/2004 | Kubose et al. |
| 2004/0134355 A1 | 7/2004 | Kasmark |
| 2004/0192141 A1 | 9/2004 | Yang et al. |
| 2004/0221436 A1 | 11/2004 | Ortega et al. |
| 2004/0242108 A1 | 12/2004 | Russell et al. |
| 2004/0255783 A1 | 12/2004 | Graham et al. |
| 2005/0026526 A1 | 2/2005 | Verdegan et al. |
| 2005/0109683 A1 | 5/2005 | Joyce et al. |
| 2005/0130031 A1 | 6/2005 | Zguris |
| 2005/0160711 A1 | 7/2005 | Yang |
| 2005/0210844 A1 | 9/2005 | Kahlbaugh et al. |
| 2005/0214188 A1 | 9/2005 | Rohrbach et al. |
| 2005/0233665 A1 | 10/2005 | Groten et al. |
| 2006/0009106 A1 | 1/2006 | Nishimura et al. |
| 2006/0074171 A1 | 4/2006 | Bach et al. |
| 2006/0094320 A1 | 5/2006 | Chen et al. |
| 2006/0096263 A1 | 5/2006 | Kahlbaugh et al. |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0207932 A1 | 9/2006 | Hajek et al. |
| 2006/0230731 A1 | 10/2006 | Kalayci et al. |
| 2006/0242933 A1 | 11/2006 | Webb et al. |
| 2006/0266701 A1 | 11/2006 | Dickerson et al. |
| 2007/0039300 A1 | 2/2007 | Kahlbaugh et al. |
| 2007/0227359 A1 | 10/2007 | Choi |
| 2008/0073296 A1 | 3/2008 | Dema et al. |
| 2009/0044702 A1 | 2/2009 | Adamek et al. |
| 2009/0050578 A1 | 2/2009 | Israel et al. |
| 2009/0266759 A1 | 10/2009 | Green |

FOREIGN PATENT DOCUMENTS

| | | |
|---|---|---|
| EP | 0451544 B1 | 10/1991 |
| EP | 0451554 | 10/1991 |
| EP | 0465203 | 1/1992 |
| EP | 1036585 | 9/2000 |
| EP | 0844861 | 3/2002 |
| EP | 1171495 | 3/2003 |
| EP | 1118632 | 4/2005 |
| EP | 1532076 | 5/2005 |
| EP | 1179673 | 12/2005 |
| EP | 1141454 | 3/2006 |
| EP | 1378283 | 4/2007 |
| WO | WO-9741167 | 11/1997 |
| WO | WO-9947211 | 9/1999 |
| WO | WO-0103802 | 1/2001 |
| WO | WO-0245098 | 6/2002 |
| WO | WO-03080904 | 10/2003 |
| WO | WO-2004089509 | 10/2004 |
| WO | WO 2005/120678 | 12/2005 |
| WO | WO-2005120678 | 12/2005 |
| WO | WO-2006052656 | 5/2006 |
| WO | WO-2006052732 | 5/2006 |

(56) References Cited

FOREIGN PATENT DOCUMENTS

| | | |
|---|---|---|
| WO | WO-2006089063 | 8/2006 |
| WO | WO-2008103821 | 8/2008 |
| WO | WO-2009088647 | 7/2009 |

OTHER PUBLICATIONS

Lennox-Kerr, "Advances in Textiles Technology", International Newsletters Ltd., UK, vol. 153, 3 pgs (Sep. 2003).

Hinds, W, "Aerosol Technology Properties, Behavior, and Measurement of Airborne Particles", Second Edition, 3 pages (Copyright 1999).

Zhao, R, "An Investigation of Bicomponent Polpropylene/Poly (ethylene Terephthalate) Melt Blown Microfiber Nonwovens, A Dissertation", Front cover, pp. i-xix, pp. 1-207, 3 Information pgs (Dec. 2001).

Hagewood, J., "Biocomponent Filtration: Variable Capacity Continuous Extended Area Filter", International Fiber Journal, vol. 14, No. 1, pp. 58-67 (Feb. 1998).

"Cost Effective Emissions Solutions for Diesel Engines", Donaldson Company brochure, 4 pgs (2004).

Dahiya, et al., "Dry-Laid Nonwovens", http://www.engr.utk.edu/mse/pages/Textiles/Dry_Laid_Nonwovens.htm, 10 pgs (Apr. 2004).

"European Search Report", EP 07119967.3, mailed May 6, 2008, 6 pgs.

"File History", for co-pending U.S. Appl. No. 10/982,538, filed Nov. 5, 2004, entitled "Filter Media and Structure", 280 pgs.

"File History", for co-pending U.S. Appl. No. 11/381,010, filed May 1, 2006, entitled "Filter Medium and Breather Filter Structure", 141 pgs.

"File History", for co-pending U.S. Appl. No. 11/986,377, filed Nov. 20, 2007, entitled "High Strength, High Capacity Filter Media and Structure", 197 pgs.

"File History", for co-pending U.S. Appl. No. 12/035,150, filed Feb. 21, 2008, entitled "Filber Element and Method", 220 pgs.

"File History", for co-pending U.S. Appl. No. 12/694,913, filed Jan. 27, 2010, entitled "Fibrous Media", 141 pgs.

"File History", for co-pending U.S. Appl. No. 12/694,936, filed Jan. 27, 2010, entitled "Method and Apparatus for Forming a Fibrous Media", 138 pgs.

"Filter Bag", Nonwovens Industry, vol. 23, No. 3, pp. 5 and 68 (Mar. 1992).

"Filtration—Daiwabo and Kyowa Jointly Produce Microfiber Filter", Nonwovens Markets, vol. 7, No. 4, p. 5 (Feb. 14, 1992).

"Final Office Action", mailed May 23, 2012 in U.S. Appl. No. 12/036,022, "Formed Filter Element" (21 pages).

"HEPA & 95% DOP Panel Filters", Donaldson Company Torit brochure, 4 pgs (2004).

"International Search Report", mailed Aug. 29, 2008, PCT/US2008/054574, 11 pgs.

"International Search Report", PCT/US2005/039793, mailed Mar. 23, 2006 (11 pgs).

"International Search Report", PCT/US2007/00963, mailed Nov. 21, 2007 (14 pgs).

Puurtinen, "Multilayering of Fine Paper with 30 Layer Headbox and Roll and Blade Gap Former", Helsinki University of Technology, Laboratory of Paper Technology Reports, Series A19 (May 14, 2004), 54 pgs.

"Non-Final Office Action", mailed Oct. 6, 2011 in co-pending U.S. Appl. No. 12/036,022, "Formed Filter Element ," (40 pages).

"Restriction Requirement", mailed Jul. 7, 2011 in co pending U.S. Appl. No. 12/036,022, "Formed Filter Element" (7 pages).

"Three-Dimensional Structure Incorporates Heterofil Fibre and Carbon Beads", Nonwovens Report, International, No. 295, pp. 8-9 (Oct. 1995).

"KRATON Polymers Grade Range", K0137 BRa-00E, Typical Properties Guide, KRATON Polymers Apr. 2001, 12 pages.

FORMED FILTER ELEMENT

CROSS-REFERENCE TO RELATED APPLICATIONS

This application is a divisional application of U.S. patent application Ser. No. 12/036,022, entitled "FORMED FILTER ELEMENT", filed Feb. 22, 2008, which claims priority from U.S. Provisional Patent Application Ser. No. 60/903,179, filed Feb. 23, 2007 and is hereby incorporated by reference in its entirety.

FIELD OF THE INVENTION

The invention relates to a filter element that can be used for general filtration. One filtration application is removing a liquid or solid particulate from a mobile fluid and methods of manufacturing the element. In one embodiment of the invention, the filter element is used to remove an oily or aqueous/oil liquid aerosol or particulate entrained in a gaseous or air mobile fluid. In such an embodiment, the aerosol entrained in the fluid contacts the media, coalesces, and drains from the media leaving the mobile fluid free of the entrained liquid aerosol particulate. The liquid accumulates in the media and under the effect of gravity, drains from the element and can be reserved.

BACKGROUND OF THE INVENTION

Cellulosic, synthetic and mixed cellulosic synthetic media in the form of a flexible paper filter have been known for many years. Such media layers have been used as is and have been combined with other filter components to form active filtration elements. Such elements can be made of a variety of macro and microfibers having a range of fiber lengths and diameters. In large part, these layers are made in papermaking machines resulting in a substrate layer typically less than 5 millimeters and most often less than 2 millimeters in thickness. Such thin flexible filter media have found a number of useful applications, however, such layers have limits in their applicability. The ability to achieve certain filtration attributes such as pore size, basis weight, thickness, permeability and efficiency are limited by the manufacturing techniques used to make the paper layers and by the components useful in such layers.

Because aerosols, as an example, may be as small as him diameter or as large as 1 mm (W. Hinds, Aerosol Technology: Properties, Behavior, and Measurement of Airborne Particles 8, $2^{nd}$ ed., © 1999 J. Wiley & Sons), conventional technologies are not suitably flexible to effectively accommodate the range of particle sizes in which aerosols may be encountered in air. Further, aerosols may be present in large concentrations in the air streams in certain filtration applications. For example, in diesel engine blow-by or other heavy duty motor exhaust or industrial filtration applications, it is possible to encounter aerosols in concentrations of 700 ppm to 20,000 ppm. Such concentrations are not filtered with high efficiency using the thin filters of the prior art; thus, multiple layers are usually employed.

Accordingly, a substantial need exists in obtaining an improved filtration layer having a substantial thickness, a defined basis weight, solidity and pore size useful for a variety of filtration processes. One useful technique is to use an aqueous slurry based material such as that disclosed in U.S. Ser. No. 11/267,958. Sugiura et al., U.S. Pat. No. 5,755,963, teach a filter element comprising microfibers made from a slurry to obtain a density gradient structure useful in oil filtration. Nielsen et al., U.S. Pat. No. 5,167,765, teach the use of polyester bicomponent fiber and other fibers in making bonded fibrous wet laid sheets for filtration applications.

Filter media have been configured in a variety of filter units for many different filtration applications. In one application, it has been common to remove liquid aerosol particulate from a mobile gaseous phase such as air by using filter elements comprising cellulosic and cellulosic/synthetic fiber combinations wet-laid flat media that has been corrugated and pleated into a useful cylindrical shaped elements of different heights and diameters. The use of formed media comprised wholly of glass fibers and aqueous or solvent based resins for the purpose of consolidating the fibers mass and providing strength and structural integrity has been practiced. Limitations thereof are specific to fiber size (approximately 0.08 to about 4 microns fiber diameter) and to the fact that a secondary process to apply the resin is necessary to consolidate the filter media and provide structural integrity for the performance and survivability of the element in such demanding applications. Further, these filter media suffer from resin migration during the filter media life, which in turn causes a loss of porosity. In use, this loss of porosity is evidenced by increased pressure drop across the filter, clogging of pores, and cracking of the filter, thus leading to early filter failure. Further, these filter media are brittle and may shatter under challenging conditions, leading to catastrophic failure. Finally, the above filter making technique has a practical limit of about 5.0 mm thickness, such that the ability to make thicker media for use with different aerosols or adaptation for other filtration applications is not provided. Nevertheless, the use of wet-laid paper-like media is prevalent in the application of removing aerosol particulates from airstreams.

Some examples of conventional commercially available filtration media for the separation of aerosols from air are products available from the Porous Media Company of St. Paul, Minn.; Keltec Technolab of Twinsburg, Ohio; ProPure Filtration Company of Tapei, Taiwan; Finite® and Balston® filters made by the Parker Hannifin Corporation of Mayfield, Ohio; Fai Filtri s.r.l. of Pontirolo Nuovo, Italy; Mann+Hummel Group of Ludwigsburg, Germany; and PSI Global Ltd. Of Bowburn Durham, United Kingdom.

A substantial need exists to provide a filter medium having improved efficiency of removal of the liquid aerosol from the air stream and reduced pressure drop, and acceptable basis weight and void volume which leads to an increased useful lifetime in application conditions. A substantial need exists to simplify the construction of such filtration apparatus, thereby decreasing the complication and expense of the manufacturing processes over those currently used. A substantial need also exists to provide a filter media having reduced brittleness that can withstand challenging conditions without shattering. A substantial need also exists to provide a filter medium that does not undergo resin migration during use. A substantial need exists to provide a method of making filter media that is adaptable for other filtration applications, such as the removal of solid particulates from air or the removal of impurities from water. A substantial need also exists for a method of making a filter that is adaptable for entraining materials such as particles and polymers that in turn provide functionality to the filter structure. Finally, there is a substantial need to provide a method of making filter media having multiple layers such that each layer has a different structure or composition, e.g. by varying permeability of the layers or by incorporating particles into a layer. These and other advantages are found in the filtration media disclosed below.

BRIEF DISCUSSION OF THE INVENTION

We have found that a useful filter element having a thickness of greater than 3 millimeters can be made by combining a bicomponent fiber and a glass fiber in a filter medium or element. A slurry of this combination of fibers can be used to form a layer. Once heated to the correct fusion temperature and cured the layer forms a mechanically stable medium. The medium can be used in a filter element having unique filtration properties unlike those of thin cellulosic or synthetic paper layers, or other mist collection systems or other thick fibrous media.

The unique filter medium of the invention may have a thickness of greater than 3 millimeters, which may be made in one step, and comprises a bicomponent fiber. Such filter medium can be manufactured using only bicomponent fiber, but can also contain other materials. Other fibers may be used, most preferably glass fibers. Two or more different kinds of glass fibers may be used advantageously in a single filter medium. Thermoplastic fibers, binder resins, natural fibers, particulate matter, or other filtration components may be advantageous to use along with, or instead of glass fibers depending on the application contemplated. Desirable materials that can add functionality to the filters of the invention include carbon particles or fibers, metal particles or fibers, silica or other ceramic particles, ion exchange resins, catalysts, enzymes, and zeolites. Further, chemical modification of the surface of fibers and/or particles may be employed advantageously, for example by reacting glass fibers with a silane coupling agent to modify surface energy either prior to, or after, inclusion of the glass fibers in the filters of the present invention. Other additive compounds may add functionality, such as antistatic or flame retardant compounds.

The invention may comprise a filter unit comprising the bicomponent fiber medium of the invention in combination with a perforate support that can be formed in a housing with other conventional filtration components. The perforate support may be made from any suitable material, such as metal or plastic, depending on the intended application. The filter unit may also comprise end caps, housings, or other conventional filter unit parts.

A method of removing a particulate from a fluid medium can use the steps of introducing the fluid medium having entrained particulate into contact with the filter medium passing the mobile fluid through the filter medium wherein the particulate is retained by the filter medium leaving a purified fluid exiting the medium. While removal of oily aerosol from a stream of air is particularly preferred and demonstrated, the skilled artisan will understand that the invention also contemplates filtration of particulates from liquids such as water, soot removal from air, and a variety of other applications generally known in the art of filtration.

A method of removing typically a liquid aerosol entrained in an air stream is for aerosol particulate to contact the fibrous medium, coating the fibrous interior of the medium and accumulating on and within the fibrous interior. As the liquid accumulates within the filter, gravity will cause the liquid to drain from the filter medium. Such media are often used in conjunction with a reservoir into which the liquid drains and can be removed continually or in a batch-wise fashion.

Multiple layered filters, wherein each layer has a different composition, thickness, or density, may be made with ease by employing the methods of the invention. Various layers may also contain functional materials. For example, one layer may have a greater permeability than another, and a different layer may contain activated charcoal. Multiple layers are achieved with ease by virtue of the flexibility of the process for making the filters of the present invention.

The unique media of this invention can be used in a variety of filtration processes including, but not limited to, removal of particulate matter from air or other gas phase materials such as nitrogen, natural gas, oxygen, and the like; particulate removal from a liquid phase material, such as water, hydraulic fluid, diesel fuel, gasoline, crankcase oil, ethanol and the like; removal of fine particulates such as smoke, exhaust particles, dust, asbestos, silica, clay, water vapor, oil vapor, metal vapor, and the like; removal of nonparticulate impurities such as volatile organic compounds (VOCs) from air or water; or removal of ozone from air.

The filter media of this invention is particularly useful in separating an entrained liquid aerosol from a mobile air phase. The media of the invention has excellent characteristics of removal of oily aerosol, for example, from a fluid stream that is largely made of air and aerosol. Thus, when a stream of air having between 2000 and 9000 ppm of oily aerosol per ppm of total fluid, more typically about 7000 ppm of oily aerosol per ppm of total fluid, is passed through the filter at 60 to 100 psi, less than or equal to 2 ppm of the aerosol remains in the air stream after filtration after a period as long as 1000 hours and after 4000 hours is able to remove the aerosol leaving less than or equal to 3 ppm or less of the aerosol in the mobile air phase after 4000 hours. The media of the invention is capable of maintaining a substantially low pressure drop over the lifetime of the media under these same conditions, wherein the lifetime can extend as long as 8000 hours. The pressure drop over the media during normal operating conditions as outlined above is less than 2 psi increase over 200 hours and is less than 1 psi additionally over a subsequent period of 7000 hours.

In a preferred embodiment, the filter medium of the invention has a permeability of about 1 to about 2 CFM, a basis weight of about 2,500 to about 3,000 gram/meter$^2$, a preferred thickness of about 8 to about 20 millimeters, and in typical filtration applications, removes the liquid aerosol from the air stream such that little or no aerosol penetrates the medium. We have found that less than 20 ppm, often less than 10 ppm and most often less than 5 ppm of the liquid aerosol penetrates the medium under typical operating conditions using the media of the invention.

We have further found that the media of the invention has substantially improved burst characteristics. In other words, under the force obtained from the pressure of the air flow through the media, that the media of the invention has the ability to withstand substantially increased pressure force during the lifetime of the media than prior structures. The strengths of the bicomponent/glass fiber media is such that it can survive pressure with a burst strength of at least 10 psi, more preferably about 25 to about 40 psi when measured according to ASTM D774 specifications.

BRIEF DISCUSSION OF THE FIGURES

FIG. 1 is a graphical representation of the data of Table 6, showing a Di-octyl Phthalate (DOP) efficiency (at 10.5 FPM) of experimental filter media FM-1 and FM-2, described in Example 1, when compared with CONTROL filter media of the present invention.

FIGS. 2 through 5 are graphical representations of the data shown in Tables 7 and 8 of the application. Generally, Tables 7 and 8 show that when compared to filter media made by prior art methodology employing aqueous based binder resin and glass fiber, the filter medium FM-1 of Example 1 provides substantially improved removal of test oil aerosol both initially and as the filter medium ages in use, when compared to the CONTROL sample of the prior art. Further, the filter medium of the present invention maintains a substantially reduced pressure drop over time, produces excellent operating conditions in terms of discharge temperature and produces an excellent flow rate in cubic feet per minute (CFM) over the lifetime of the filter medium.

DETAILED DISCUSSION OF THE INVENTION

Figure 1:
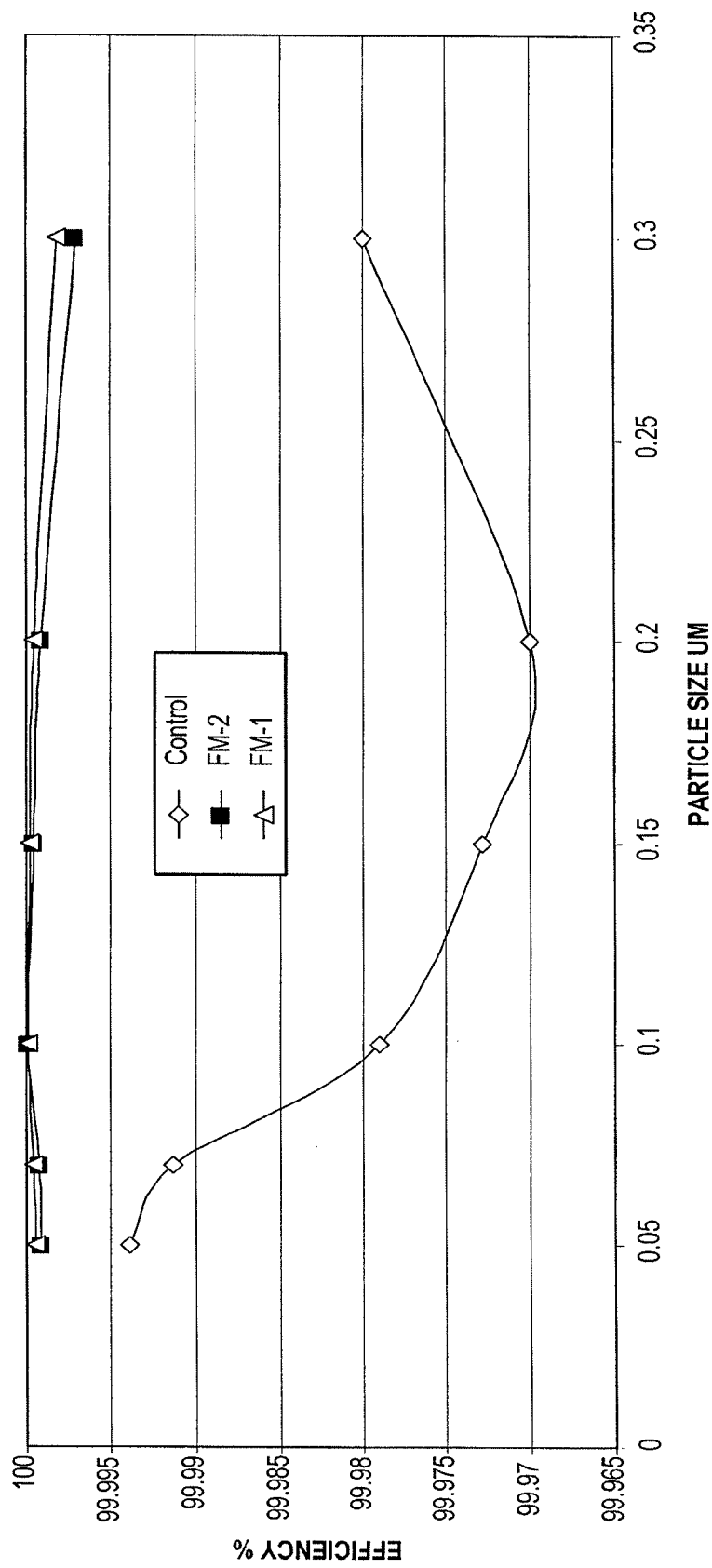

The unique filter media of the invention typically is manufactured employing a wet laid process. The process involves adding bicomponent fiber to an aqueous media to form slurry, forming the slurry into a layer of fiber, and curing and drying the layer to form the filter media. Such media can be used for general filtration purposes, but particularly is useful in separating a liquid aerosol from an air stream. Bicomponent fiber is a known material in which the fiber contains an amount of polymer having a relatively high melting point and a second amount of a polymer having a relatively low melting point. In the formation of a layer, the fiber is heated to a temperature such that the low melting point polymer can melt, fuse and bind the layer into a mechanically stable, unitary mass. The relatively high melting point polymer component can provide mechanical strength and stability to the layer.

Glass fiber is preferably employed along with the bicomponent fiber and may be added along with the bicomponent fiber in the slurry. The use of glass fiber in conjunction with the bicomponent fiber provides control over the filtration properties for certain applications. However, glass fiber is not a requirement for making the filters of the invention. Bicomponent fiber alone may be formed into a filter of the invention. Additionally, materials such as thermoplastic fibers, inorganic fibers, particles, binder resins, or other additives may be included in the filter making slurry to form a filter having functionality tailored for the application contemplated. Such materials may be included in addition to, or instead of, glass fiber.

In selecting the bicomponent fiber, various combinations of polymers may be useful in the present invention, but it is important that the first polymer component melt at a temperature lower than the melting temperature of the second polymer component and typically below 200° C. Further, the bicomponent fibers are integrally mixed and evenly dispersed with other materials in the filter making slurry. Melting of the first polymer component of the bicomponent fiber is necessary to allow the bicomponent fibers to form a tacky skeletal structure, which upon cooling, binds to other bicomponent fibers as well as other fibers or particles in the formed filter layer.

Bicomponent fibers having a sheath-core structure are particularly useful in making the filters of the invention. In the sheath-core structure, the low melting point (e.g., about 80 to 200° C.) thermoplastic is typically extruded around a fiber of the higher melting (e.g., about 200 to 260° C.) point material. In use, the bicomponent fibers typically have a fiber diameter of about 5 to 50 micrometers often about 10 to 20 micrometers and typically in a fiber form generally have a length of 0.1 to 20 millimeters or often have a length of about 0.2 to about 15 millimeters. Any thermoplastic that can have an appropriate melting point can be used in the low melting component of the bicomponent fiber while higher melting polymers can be used in the higher melting "core" portion of the fiber.

The cross-sectional structure of such fibers can be, as discussed above, the "sheath-core" structure, or other structures that provide the same thermal bonding function, such as "side-by-side" structures or lobed fibers where the fiber tips have lower melting point polymer. The value of the bicomponent fiber is that the relatively low-temperature melting resin can melt under sheet, media, or filter forming conditions to act to bind the bicomponent fiber, and other fibers present in the sheet, media, or filter making material into a mechanically stable sheet, media, or filter. Once melted and fused to other fibers or particles in the filter media of the invention, the stability of the structure is manifested in the observation that there is no migration of materials in the filter. Such migration is typically seen in filters made using glass fiber and binder resins.

Typically, the polymers of the bicomponent fibers are made up of different thermoplastic materials. For example, polyolefin/polyester (sheath/core) bicomponent fibers may be used, such that the polyolefin, e.g. polyethylene sheath, melts at a temperature lower than the polyester, e.g. polyethylene terephthalate core. Typical thermoplastic polymers having useful melting points for use either in a high or low melting portion can include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, KRATON® rubbers available from Kraton Polymers U.S. LLC of Houston, Tex., and the like.

Particularly preferred in the present invention is a bicomponent fiber known as Advansa 271P, a 14 micrometer diameter fiber available from EXSA Americas, New York, N.Y. Other useful fibers include FIT 201 (available from Fiber Innovation Technology, Inc. of Johnson City, Tenn.), Kuraray N720 (available from the Kuraray Co., Ltd. of Osaka, Japan) and similar commercially available materials. All of these commercially available bicomponent fibers can facilitate the cross-linking of a filter construction of the current invention by melting and fusing a sheath polymer to other fibers of the filter construction.

Selection of melting points for the portion of the bicomponent fiber that melts and fuses to bind the layer mechanically is important. In any filtration application, the mobile fluid will have an operating temperature. Mobile fluids of a high operating temperature such as lubricant oil, hydraulic fluid, etc. must be used with a filtration medium having fibers with a thermal characteristic such that the material does not melt at operating temperatures. The filter medium made using glass fiber and bicomponent fiber tends to be relatively temperature stable due to the presence of a relatively large mass of glass and polymer. However, relatively little experimentation is needed to determine the temperature at which the lower temperature polymer might initiate failure of the medium when exposed to high temperature mobile fluids in the filtration operation. The bicomponent fiber can then be selected in order to obtain a dimensionally and mechanically stable filtration medium in the presence of the target fluid temperature.

The preferred glass fiber used in media of the present invention include glass types known to those skilled in the art by their designations: A, C, D, E, Zero Boron E, ECR, AR, R, S, S-2, N, and the like. Generally, the skilled artisan will recognize that any glass that can be made into fibers either by drawing processes used for making reinforcement fibers or by spinning processes used for making thermal insulation fibers. Such fibers are typically about 0.1 to 50 micrometers (μm) in diameter, more typically about 0.2 to 20 μm, and have aspect ratio of about 10 to 10,000. These commercially available fibers can be sized with a sizing coating or can be unsized. Such coatings cause the otherwise ionically neutral glass fibers to form and remain in bundles. Glass fiber in diameter less than about 1.0 micron is not sized. Large diameter chopped glass is typically sized. The sizing composition and cationic antistatic agent eliminates fiber agglomeration and permits a uniform dispersion of the glass fibers upon agitation of the dispersion in the tank.

The typical amount of glass fibers for effective dispersion in the glass slurry is between about 5% to about 80%, more preferably about 50 to about 80%, by weight of the solids in the dispersion. Blends of glass fibers can substantially aid in improving permeability of the materials. We have found that a useful filtration medium can be made by combining bicomponent fiber and glass fiber. Such media, depending on glass content and glass fiber size can obtain permeability, efficiency, and filter lifetime sufficient for a number of applications. In applications involving removal of a liquid aerosol from a mobile air stream, a medium comprising a bicomponent fiber in combination with a relatively larger glass fiber with a relatively smaller glass fiber can obtain a useful and highly active filtration media. Such media contains a glass fiber that contains a substantial proportion of a glass fiber having a diameter of greater than about 1 micron and a substantial amount of a glass fiber having a fiber diameter of less than 1.0 micron.

The combination of bicomponent fiber and glass fiber can be formed into a useful layer which can be fused by heat into a mechanically stable useful filter medium. While no additional binder in the form of fiber or resin is generally needed for such structures, this invention contemplates the use of additional binder materials when needed for a specific application. Binder resins can comprise water-soluble, solvent borne, or latex based materials. Binder materials may be provided in dry form, in a solvent, or in an aqueous dispersion. Such useful polymer materials include acrylic polymers, ethylene vinyl acetate polymers, ethylene vinyl polyvinyl alcohol, ethylene vinyl alcohol polymers, polyvinyl pyrrolidone polymers, and natural gums and resins useful in aqueous solution.

Latex-based binders may also be used to bind together the filter media of the present invention. Latex binders can be selected from various latex adhesives known in the art. The skilled artisan can select the particular latex adhesive depending upon the type of fibers that are to be bound. The latex adhesive may be applied by known techniques such as spraying or foaming. Generally, latex adhesives having from 15 to 25% solids are used. The dispersion can be made by dispersing the fibers and then adding the binder material or dispersing the binder material and then adding the fibers. The dispersion can, also, be made by combining a dispersion of fibers with a dispersion of the binder material. The concentration of total fibers in the dispersion can range from 0.01 to 5 or 0.005 to 2 weight percent based on the total weight of the dispersion. The concentration of binder material in the dispersion can range from 10 to 50 weight percent based on the total weight of the fibers.

Alternatively, a binder resin may be delivered from a solvent other than water. Solvent borne binders may be advantageous where a particular resin cannot be delivered from water, but the properties of the resin are highly desirable. Solvent delivery is also necessary where the polymer is reactive toward water, and the reaction should be prevented prior to contact with the filter fibers. Non-limiting examples of suitable solvents for delivery of binder resins include acetone, methyl ethyl ketone, methyl isobutyl ketone, toluene, methanol, ethanol, isopropanol, methylene chloride, dichloromethane, hexane, cyclohexane, tetrahydrofuran, diethyl ether, mixtures thereof and mixtures with water, and the like. Polymers that are usefully delivered from water can include, but are not limited to, phenolic resins, polyvinyl acetate, polyvinyl alcohol, acrylic resins, methacrylic resins, polyurethanes, cyanoacrylates, epoxies, melamine resins, and polycaprolactones.

Useful examples of commercially available solvent borne binders include phenolic resins available from Dynea of Helsinki, Finland, and Ashland, Inc. of Covington, Ky., among others; polyvinyl acetate available from Rohm & Haas Company of Philadelphia, Pa., H.B. Fuller Company of Vadnais Heights, Minn., and Air Products and Chemicals, Inc. of Allentown, Pa., among others; polyvinyl alcohol available from Rohm & Haas, Dow Chemical Co. of Midland, Mich., Reichhold, Inc. of Research Triangle Park, N.C., and Hexion Specialty Chemicals of Columbus, Ohio, among others; acrylic resins available from Rohm & Haas Company of Philadelphia, Pa., H.B. Fuller Company of Vadnais Heights, Minn., and Air Products and Chemicals, Inc. of Allentown, Pa., among others; methacrylic resins available from Ciba Specialty Chemicals (Araldite® resins) of Tarrytown, N.Y., Dow Chemical Co. of Midland, Mich., Hexion Specialty Chemicals of Columbus, Ohio, and Reichhold, Inc. of Research Triangle Park, N.C., among others; polyurethanes available from Dow Chemical Co. of Midland, Mich. and Ciba Specialty Chemicals of Tarrytown, N.Y., among others; cyanoacrylates available from Henkel Loctite of Rocky Hill, Conn.; epoxies available from Dow Chemical Co. of Midland, Mich., Hexion Specialty Chemicals of Columbus, Ohio, and Ciba Specialty Chemicals of Tarrytown, N.Y., among others; melamine resins available from Ciba Specialty Chemicals of Tarrytown, N.Y., Cytec Industries, Inc. (Cymel®) of West Paterson, N.J., and Hexion Specialty Chemicals of Columbus, Ohio, among others; and polycaprolactones available from Solvay America Inc. (Capa®) of Houston, Tex.

Binder resins such as those described above can be used to help bond such media fibers into a mechanically stable filter medium. Such thermoplastic binder resin materials can be used as a dry powder or solvent system, but are typically aqueous dispersions (a latex or one of a number of lattices) of vinyl thermoplastic resins. A resinous binder component is not necessary to obtain adequate strength for the filter construction of this invention, but can be used to help bond thermoplastic fibers into the filter media matrix. Resin used as binder can be in the form of water soluble or dispersible polymer added directly to the filter-making dispersion or in the form of thermoplastic binder fibers of the resin material intermingled with other fibers of the filter making slurry to be activated as a binder by heat applied after the filter media is formed.

Media fibers may also be incorporated into the filter media of the present invention. Media fibers are fibers that can aid in filtration or in forming a structural media layer. Such fiber may be made from a number of hydrophilic, hydrophobic, oleophilic, and oleophobic materials. Media fibers may be present with or without glass fibers in the filter media of the present invention. When needed, these fibers cooperate with the bicomponent fiber and any other components present in the slurry to form a mechanically stable, but strong, permeable filtration media that can withstand the mechanical stress of the passage of fluid materials and can maintain the loading of particulate during use. Such fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramid nylon, polyolefin, polyester fibers.

One type of media fiber is a binder fiber that cooperates with other components to bind the materials into a sheet. Another type a structural fiber cooperates with other components to increase the tensile and burst strength the materials in dry and wet conditions. Yet another type of media fiber is one that enhances the entrapment of specific components during filtration of the fluid stream.

Useful media fiber materials include, but are not limited to, polyester fibers, polyamide fibers, aramid fibers, polypropylene fibers, copolyetherester fibers, polyethylene terephthalate fibers, polybutylene terephthalate fibers, polypropylene fibers, polyethylene fibers, polyvinyl acetate fibers, polyvinyl alcohol fibers (including various hydrolysis of polyvinyl alcohol such as 88% hydrolyzed, 95% hydrolyzed, 98% hydrolyzed and 99.5% hydrolyzed polymers), polylactic acid fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46). Further, cellulosic fibers such as cotton, viscose rayon, and other common fiber types may be used in some embodiments of the current invention. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Media fibers can also include inorganic fibers such as carbon/graphite fiber, metal fiber, metal oxide fiber, ceramic fiber, and combinations thereof.

The filter media of the present invention also contemplates the use of functional materials for specific filtration needs. Functional materials may be particulates of silica, clay, carbon, powdered metals or metal oxides; glass micro-spheres, ceramics, thermoplastic or thermoset resin particles or fibers; catalysts such as Hopcalite type air purification catalysts, e.g. Carulite® Catalyst available from the Cams Corporation of Peru, Ill.; or other structures such as carbon nanotubes, zeolites, enzymes that are free or bound to polymeric backbones, or ion exchange resins. Any material capable of being entrained in the filter making slurry may be used, where a specific application may require the use of a specialized filtration component.

The filter media of the present invention also contemplates the use of fiber treatments to modify the surface properties of the fibers or affect the bulk properties of the filter media. Surface properties of glass fibers, bicomponent fibers, or other materials present in the filter media may be modified. Acidic or basic compounds may be added to the slurry; reactive materials that affect the hydrophobicity or hydrophilicity may be employed either in the slurry or by a post-treatment after fusing the bicomponent fibers; flame retardants may be entrained; surface finish chemicals may be used; or antistatic agents may be employed. For example, hexamethyl disilazane (HMDZ) may be sprayed onto the formed filter or added by dipping the formed filter in a solution of HMDZ; HMDZ can react with e.g. glass fibers to provide a surface having trimethylsilyl functionality, thereby rendering the glass surface hydrophobic. Other agents may be employed to affect surface energy of the fibers in the filter media of the present invention.

The media of the invention can be made using any system that can accumulate the fiber into a thick layer. The media of the invention can be made into any shape that can be formed using the fibers of the invention. Useful forms of such a layer are flat media, cylindrical media, and the like.

The technologies used in media making are typically related to papermaking processes adapted to thicker layers. The skilled artisan will appreciate that papermaking processes known as wet laid processes are particularly useful and many of the fiber components are designed for aqueous dispersion processing. The machines that can be used in wet laid sheet making include hand laid sheet equipment, Fourdrinier papermaking machines, cylindrical papermaking machines, inclined papermaking machines, combination papermaking machines and other machines that can take a properly mixed slurry of components, form a layer or layers of the components of the needed thickness, and remove the fluid aqueous components to form a wet sheet. Wet-laid manufacturing of the media/elements of the present invention typically comprises the following steps:

1—Weighing fibers to the specified recipe and proportions.
2—Mixing fibers into an aqueous slurry for a sufficient time [between 30 and 45 minutes], at a water-to-fiber ratio of approximately 1:0.002.
3—Vacuum forming the media/element onto a suitable perforated cylinder, perforated sheet, cone or any suitable shape. The forming support must be suitably open to allow water to flow across, allow the free passage of water and the deposit of the fibers onto the perforated form thus creating the desired element shape and thickness. The perforated shape is completely immersed and held under vacuum from 2-35 seconds, depending on the desired thickness and basis weight. Vacuum level can be from 10 in. Hg to 29 in. Hg, depending on the thickness, basis weight, density and solidity desired.
4—Retracting the formed media/element from the fiber slurry and maintaining the vacuum for another 15-30 seconds to extract as much of the water as possible.
5—Removing the media or element from vacuum fixture and placing it in a thru-air drying oven to drive off remaining water. The oven temperature and residence time in the oven is adjusted to melt the low melting component of the bicomponent fibers and activate fiber-to-fiber adhesion. In a preferred embodiment, the bicomponent fiber used is Advansa 271P, and the oven temperature is adjusted to 300° F. and residence time is 25-60 minutes.
6—Cooling the media/element at room temperature.

The skilled artisan will recognize that an advantageous aspect of the current invention is that no further media processing is necessary. After carrying out the foregoing manufacturing steps, the formed filter media are ready for incorporation into a filtration assembly. The skilled artisan will appreciate that a finished filter assembly can comprise end caps, housings, and the like, and that the method of assembly and the parts required for assembly will depend on the intended end use.

Once sufficiently dried and processed to filtration media, the sheets are typically about 5 to 50 millimeters in thickness, have a pore size of about 0.55 to about 50 micrometers, a basis weight of about 50.0 to about 3,000.0 grams/meter$^2$ or about 50.0 to about 1,000.0 grams/meter$^2$, a solidity of about 4.0 to about 7.0%, and a permeability of about 0.5 to about 200 fpm.

In some embodiments, the filter media of the invention may be formed as a substantially planar web or a mat. The web or mat may further be coated with a binder by conventional means, e.g., by a flood and extract method and passed through a drying section which dries the mat and cures the binder, and thermally bonds the sheet, media, or filter. The resulting web or mat may be collected in a large roll or left substantially flat as formed The filter media of the invention can also be formed into a variety of geometric shapes using forms to hold the wet composition during thermal bonding. In forming shaped media, a layer is formed by dispersing fibers in an aqueous system, and forming the filter on a mandrel with the aid of a vacuum. The formed structure is then dried and bonded in an oven. By using a slurry to form the filter, this process provides the flexibility to form several structures, such as cylinders, tubes, cones, and ovals.

The filter media of the present invention can further be formed as multilayer filter media having different components in the different layers. For example, a first layer of filter media may be formed using the above techniques and materials, and formed into the desired shape and thickness, pore size, etc. After the oven drying step, the filter media may be immersed in a second slurry having a different composition to result in e.g. different permeability from the first layer, or by imparting functionality such as by incorporating activated charcoal. The manufacturing process is thus repeated to provide a two-layer filter. In this manner, multiple filter layers may be added.

Similarly, instead of immersing the filter media in a second slurry after the first oven drying step, the second slurry may be applied after vacuum drying but before the final oven drying step; in this manner, multiple layers may be deposited to the filter media, followed by a single oven drying step that is carried out after some or all of the filter media layers have been applied.

Thus, multiple layers may incorporate differing pore sizes, different permeability, different fiber materials to filter different specific components, or addition of other additives such as particulates to different layers. The skilled artisan will appreciate the ability of a multiply layered filter media of the present invention to filter several specific particle types or sizes using one filter assembly, or alternatively to provide a media that both filters particles and entraps airborne chemicals on a molecular scale, or media that combines any number of the uses contemplated by various embodiments of the invention into a single assembly.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

DETAILED DISCUSSION OF THE FIGURES

FIG. 1 is a graphical representation of the data derived from a filter efficiency test, wherein latexes having varying particle size borne in an air stream and passed through the filters of the present invention, labeled FM-1, FM-2, and a control sample, labeled CONTROL. FM-1 is a single layer filter employing glass fibers, while FM-4 is a dual layer filter employing glass fibers. CONTROL is a filter of the prior art comprising glass fibers and a binder resin. Particles ranging in size from 0.05 micron to 0.3 micron are employed in the test, and the particles are present at about 6,800 ppm per million parts of the fluid passed through the media. The number of particles present on the post-filtration side of the filters is measured, and the result is expressed in a percent efficiency for each particle size. It may be observed that the filters of the present invention have a superior ability to entrap particles over the range of particle sizes used.

Figure 2:
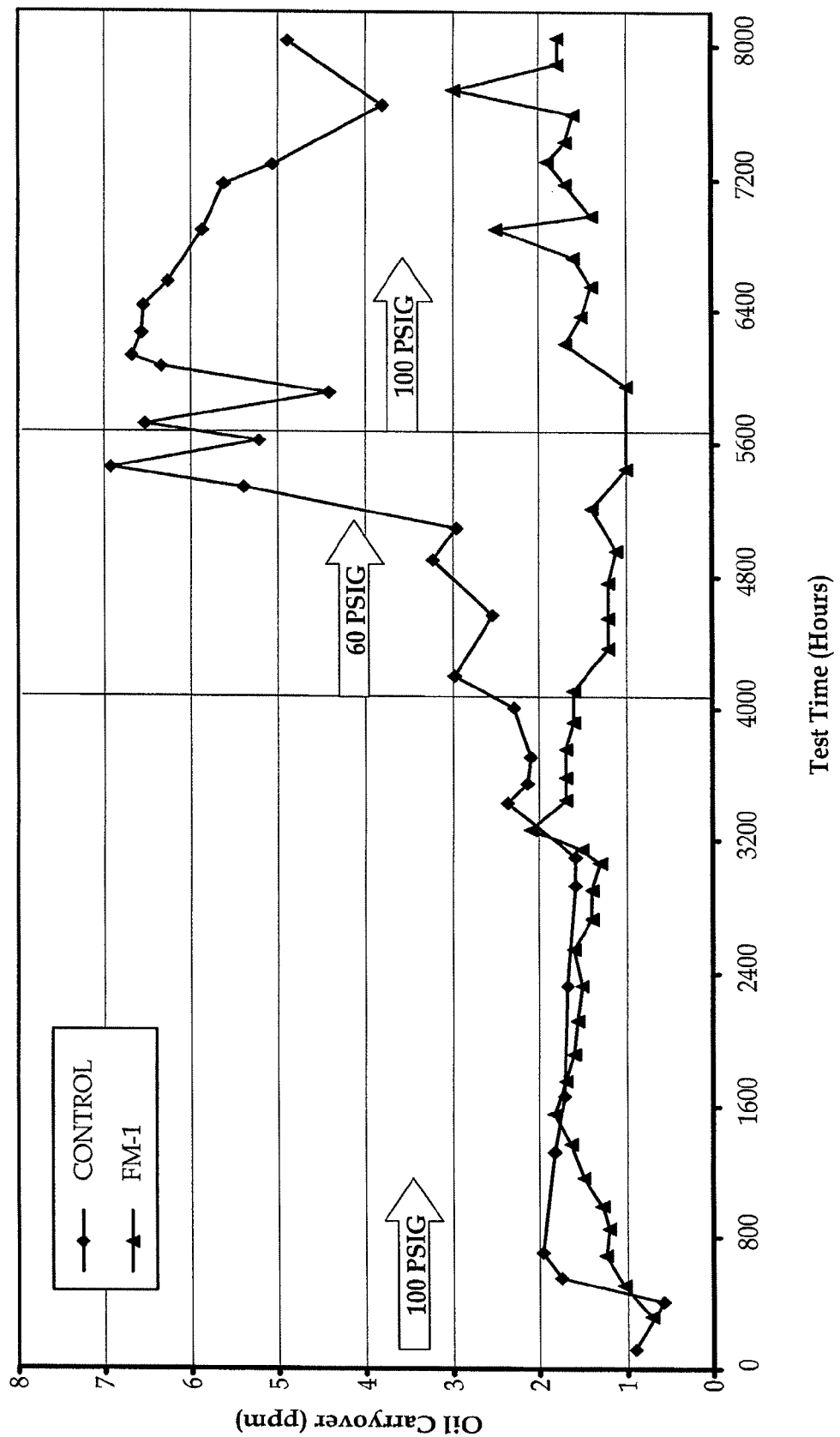

FIG. 2 is a graphical representation of data derived from an air compressor test, wherein the experimental filter FM-1 and CONTROL were incorporated into filter elements and mounted inside an air compressor apparatus for 8000 hours of actual run time wherein the filters were filtering oily particulate from the air stream during operation of the compressor. Periodic measurements show the superior performance of the filter media of the present invention in trapping oily aerosols in a long-term air filtration application. Oily aerosol particulate carryover into the filtered air was measured at both 60 psig and 100 psig. FIG. 2 shows that the oil carryover passing through the FM-1 filter is 2.0 ppm or less (flowing form outside to inside) for the duration of the test, while the CONTROL filter media had about 2.0 ppm carryover initially but became less effective over time, such that carryover was 5.0 ppm or more by the end of the test.

Figure 3:
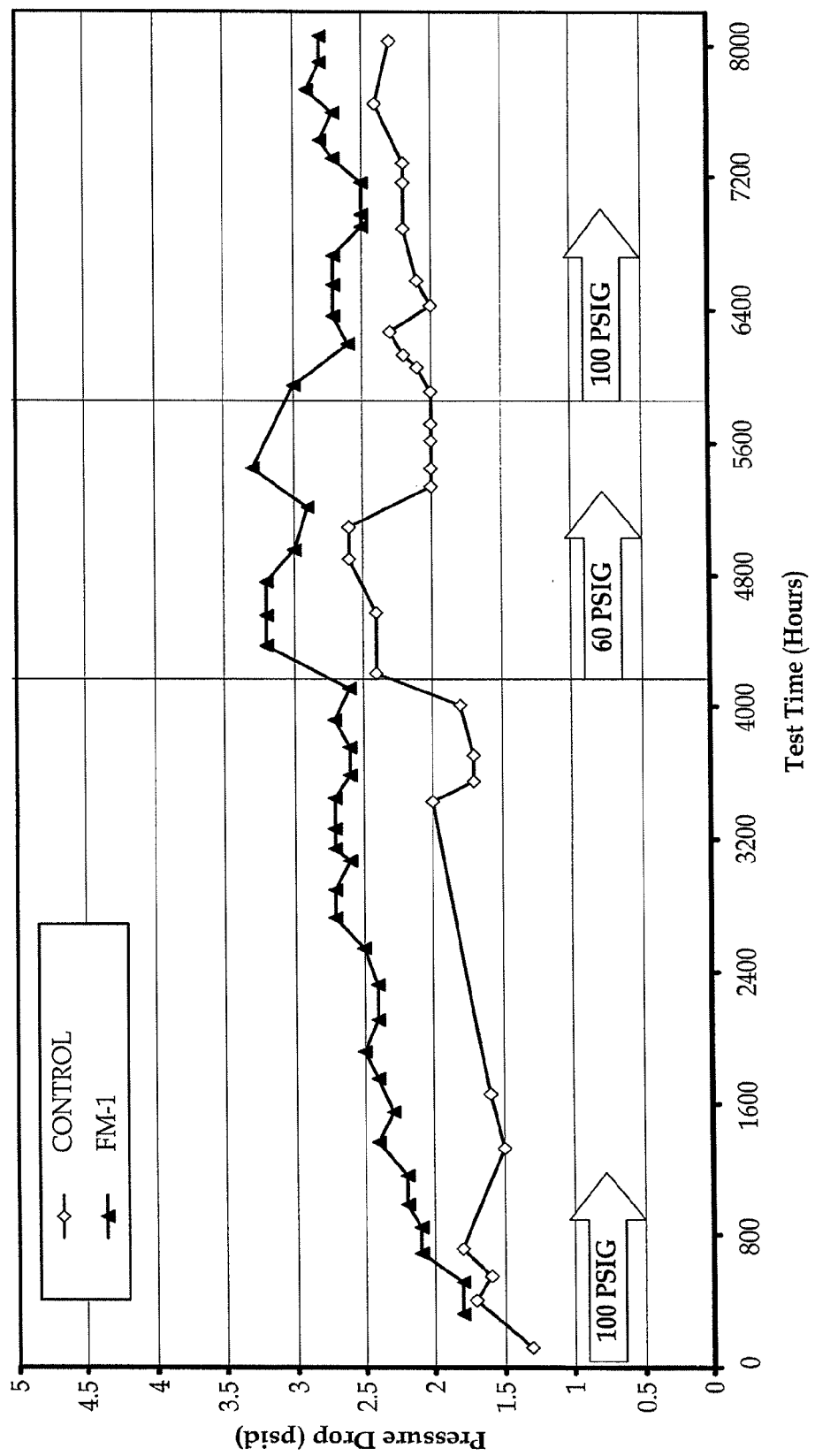

FIG. 3 is a graphical representation of data derived from the same air compressor test, showing that the pressure drop across the medium of the invention is acceptable even in view of the increased oil collection capacity of the medium. In the course of the same test as conducted above, resulting in the data represented by FIG. 1, pressure drop across the filter was also monitored. The results show that the FM-1 filter media maintained acceptable pressure drop over the course of the 8000 hour test, despite entrapping more oily aerosol than CONTROL (as shown in FIG. 2). The pressure drop for the FM-1 filter media stayed well below the industrially acceptable maximum level of 10.0 psid for the duration of the test, even though it entraps more oily aerosol than CONTROL, as is shown in FIG. 2.

Figure 4:
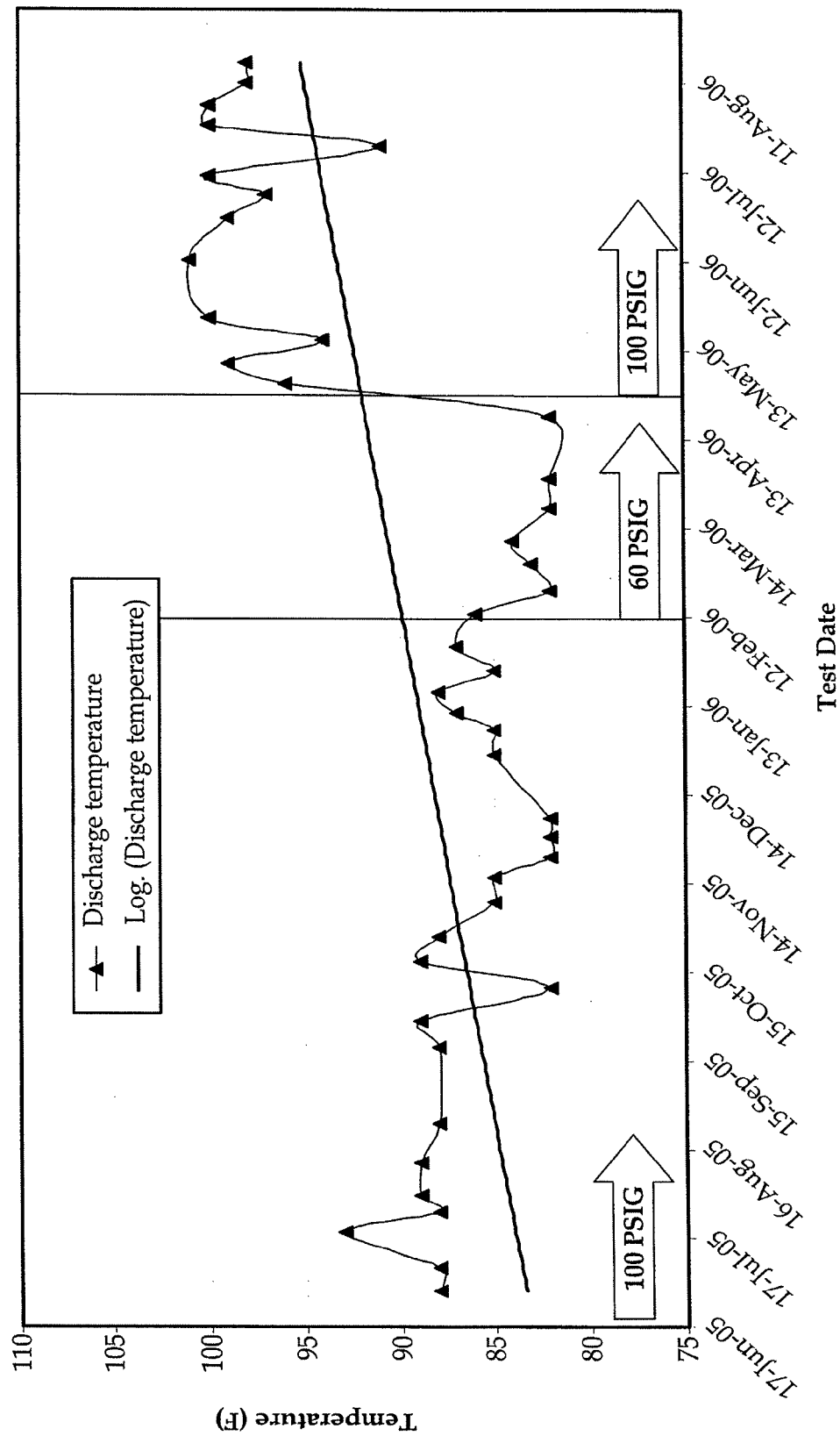

FIG. 4 is a graphical representation of data derived from the same air compressor test, showing the discharge temperature of the air stream passed through FM-1 over a test period of about 14 months (about 10,000 hours). The discharge temperature is indicative of operating conditions and compressed air temperature. Discharge temperatures of up to 120° C. are considered the industrially acceptable limit, as temperatures above this typically exceed operating temperatures in machinery where the filters of the invention may be used. The discharge temperature was acceptable over time of the test, and in fact declined over the course of the first ten months (about 7200 hours), showing that FM-1 was not severely challenged or in danger of failure, even though it entraps a higher volume of oily aerosol particles than CONTROL, as is shown in FIG. 1.

Figure 5:
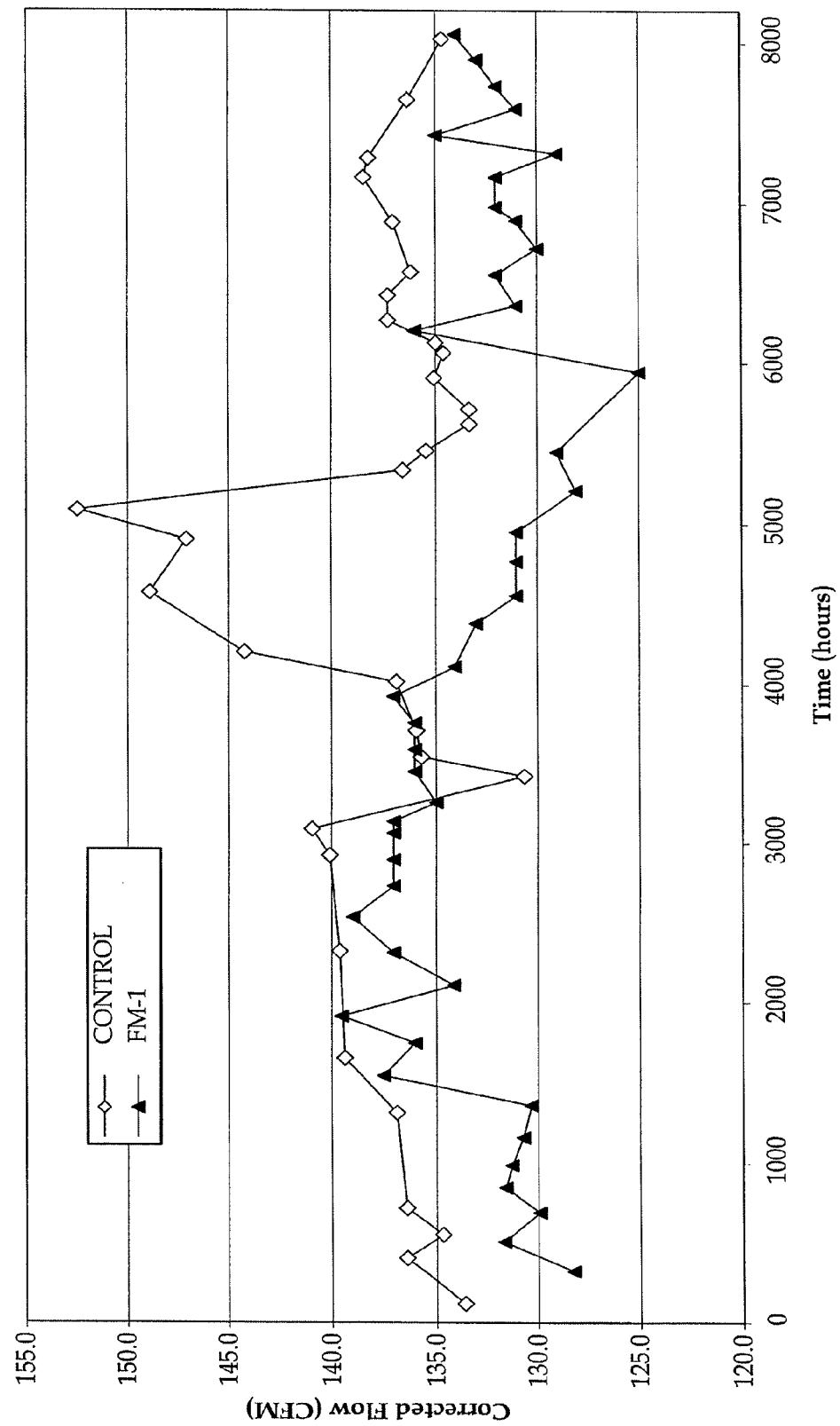

FIG. 5 is a graphical representation of data derived from the same air compressor test, showing the flow rate, or volume, of air passing through the FM-1 filter medium compared to the CONTROL medium. The air flow of the medium of the invention remained substantially consistent over the lifetime of the test, thus showing that in long-term use a filter of the present invention does not become clogged, even though the FM-1 filter medium traps a higher volume of oily aerosol than CONTROL, as is shown in FIG. 2.

Figure 6:
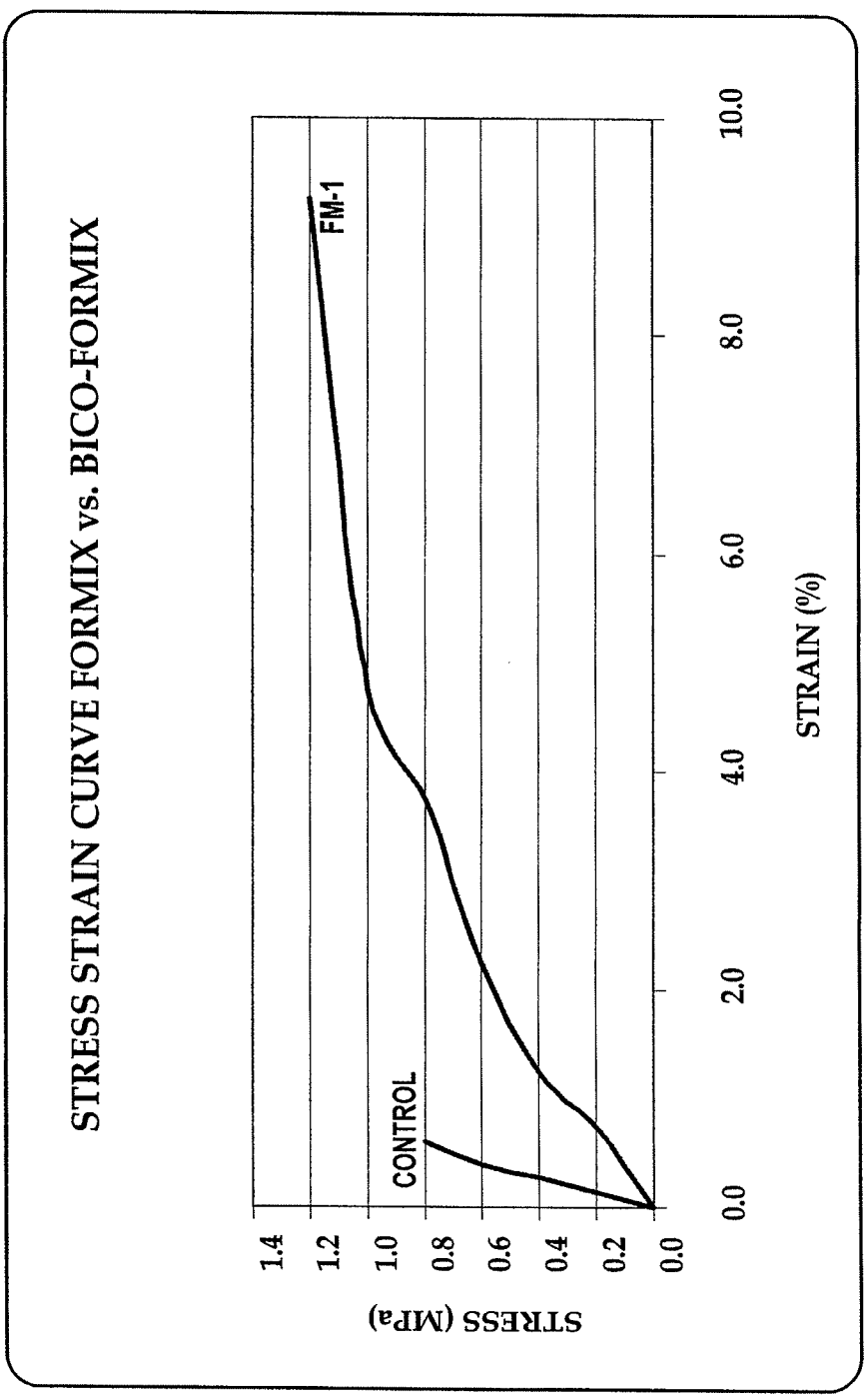
FIG. 6 shows the tensile strength and elongation at break for a filter of the present invention when compared to a filter of the prior art.

FIG. 6 is a graphical representation of the stress-strain properties of FM-1 and CONTROL. Both media were measured at a strain rate of 2.54 cm/min, and the resulting force measured. It can be observed that the filters of the present invention have a higher elongation at break, and a higher tensile strength, than the filters of the prior art.

FIGS. 7A through 7F are electron photomicrographs showing side views of the FM-1, FM-2 media and inside and side views of the FM-3 filter media of the invention, as well as a side view of the CONTROL sample. The photomicrographs clearly show the glass fiber and the bicomponent fiber in a combination matrix having a substantial void volume, effective pore size and uniform distribution of materials leading to a high quality, high strength filter medium that will display high efficiency, high burst strength, useful solidity, long lifetime, low pressure drop and other beneficial characteristics derived from the unique structure of the medium.

Figure 7A:
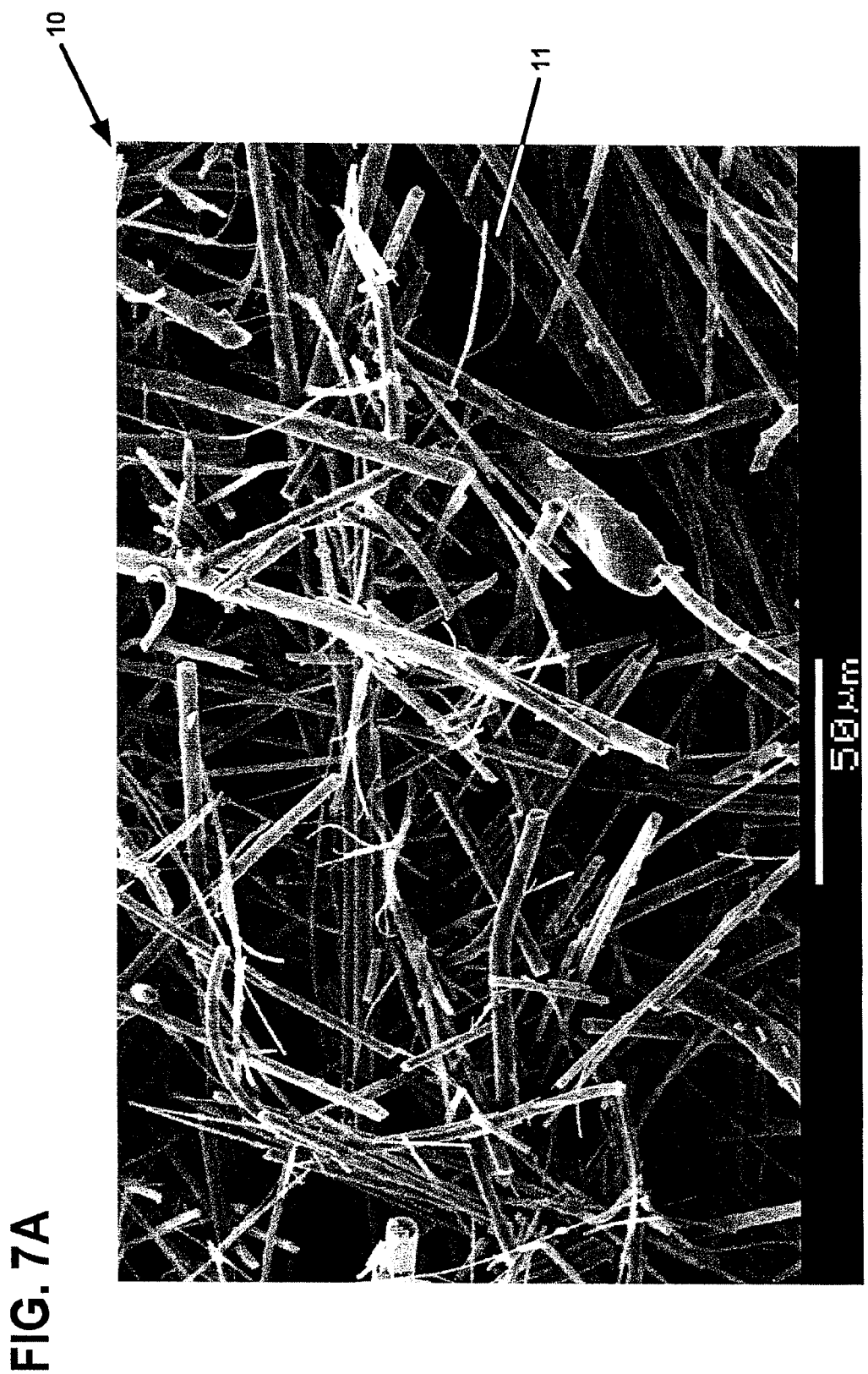
FIGS. 7A through 7F are photomicrographs of a view from the side or inside of the filter media of the present invention, further described in the Experimental section as FM-1, FM-2, and FM-3 in addition to similar photomicrographs of a filter of the prior art having glass fibers and binder resin.
Figure 7B:
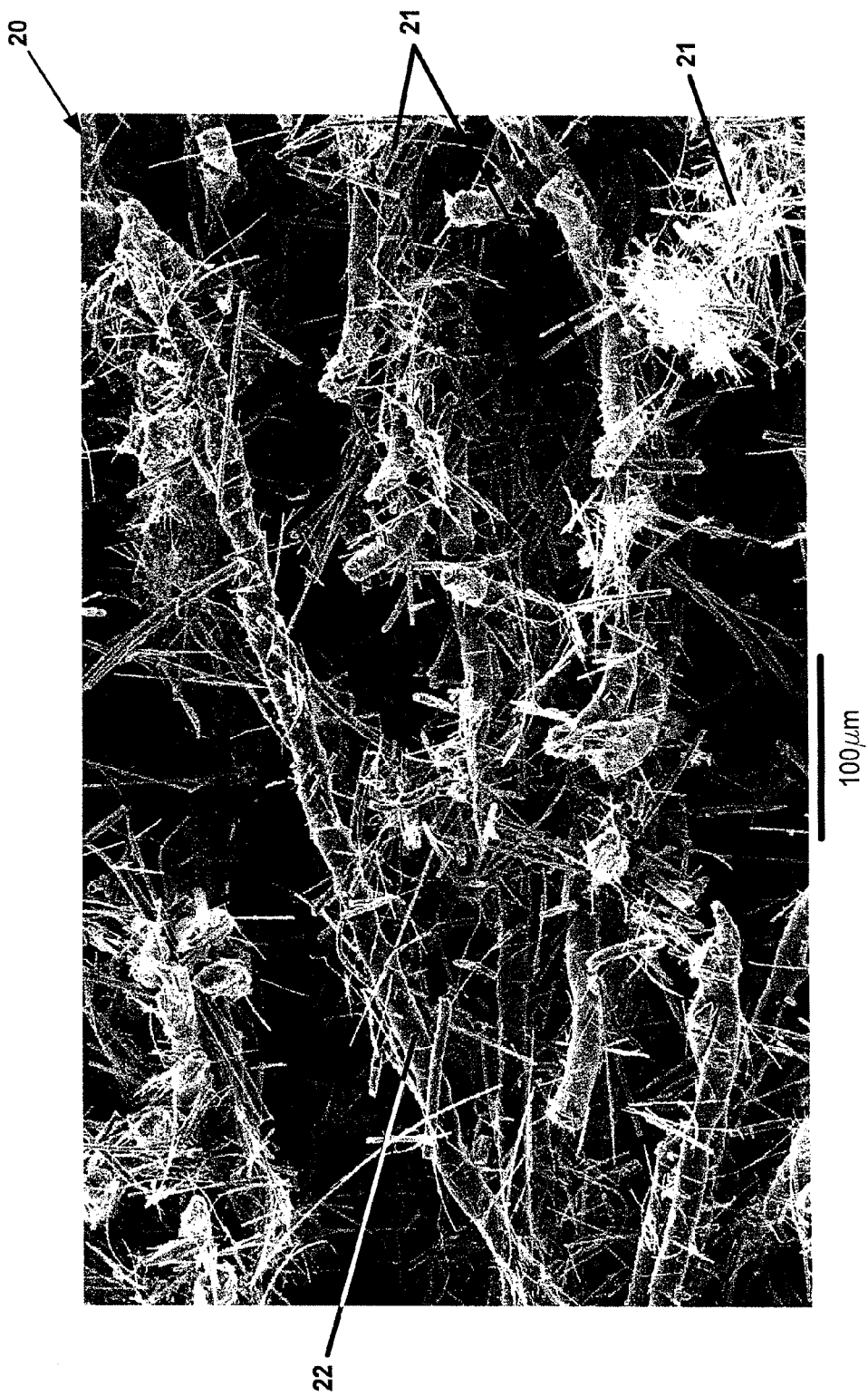
Figure 7C:
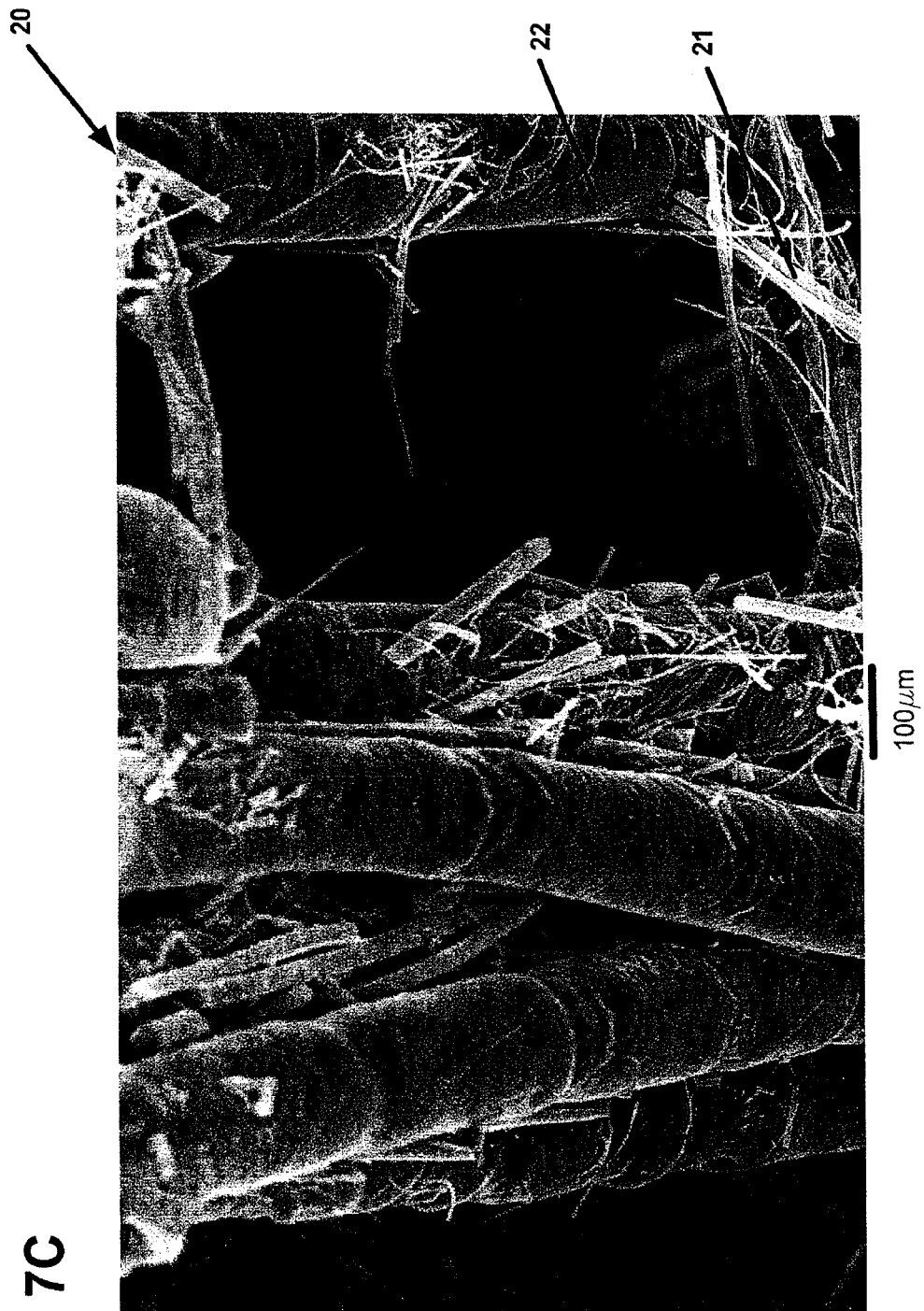
Figure 7D:
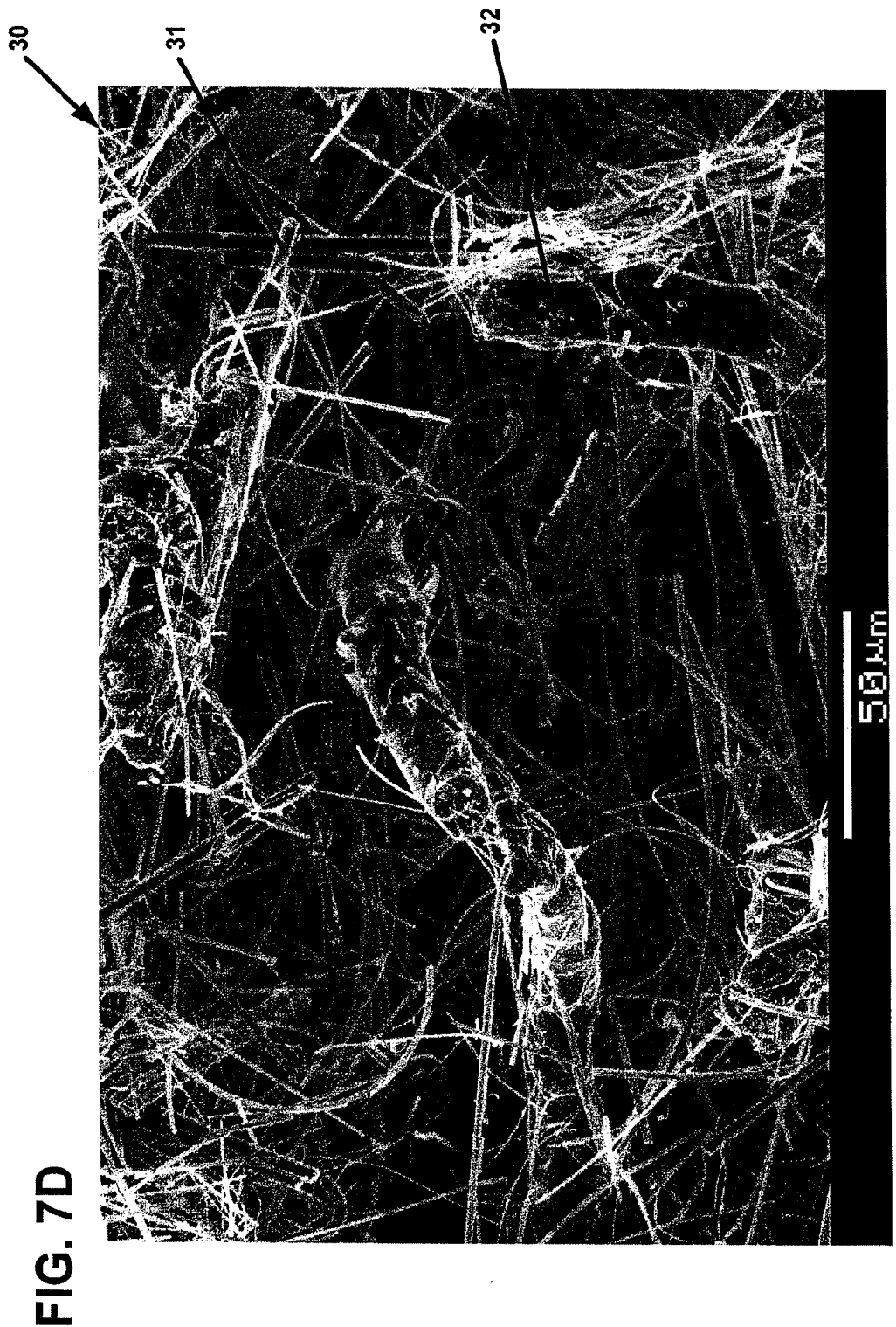
Figure 7E:
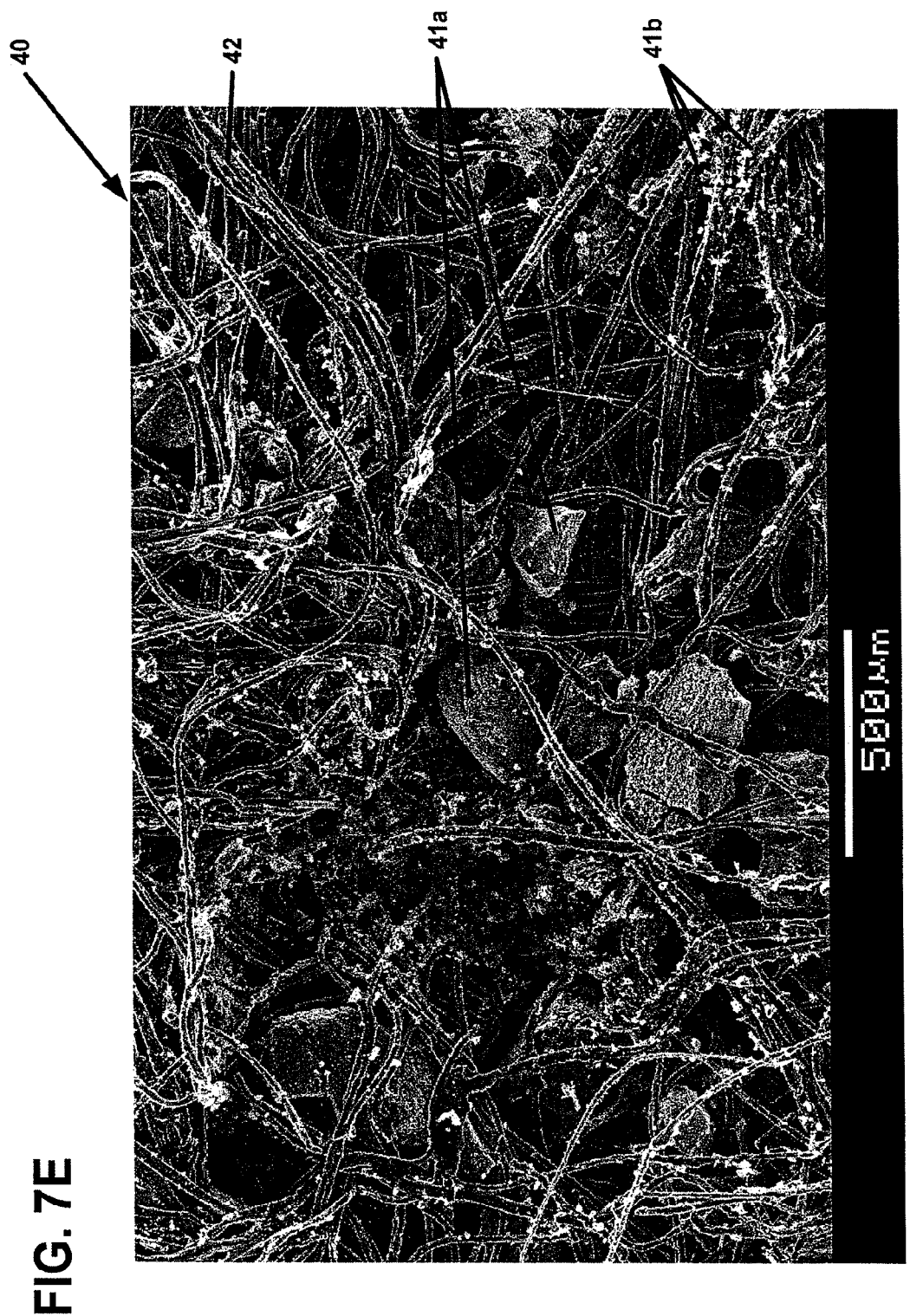
Figure 7F:

FIG. 7A shows a side view of the CONTROL filter medium at 500× magnification. The filter medium 10 has glass fibers 11. FIGS. 7B and 7C show a side view of a filter medium of the present invention, FM-1, at 200× (FIG. 7B) and 1000× (FIG. 7C), respectively. The filter medium 20 has glass fibers 21 and bicomponent fibers 22. FIG. 7D is a side view of a filter medium of the present invention, FM-2, at 500×. Filter medium 30 has glass fibers 31 and bicomponent fibers 32. FIG. 7E is a view of the interior of a filter medium of the present invention, FM-3, at 50×. Filter medium 40 has larger carbon particles 41a, smaller carbon particles 41b, and bicomponent fibers 42. FIG. 7F is a side view of FM-3 at 1000×. This view of medium 40 shows the smaller carbon particles 41b and bicomponent fibers 42.

Figure 8A:
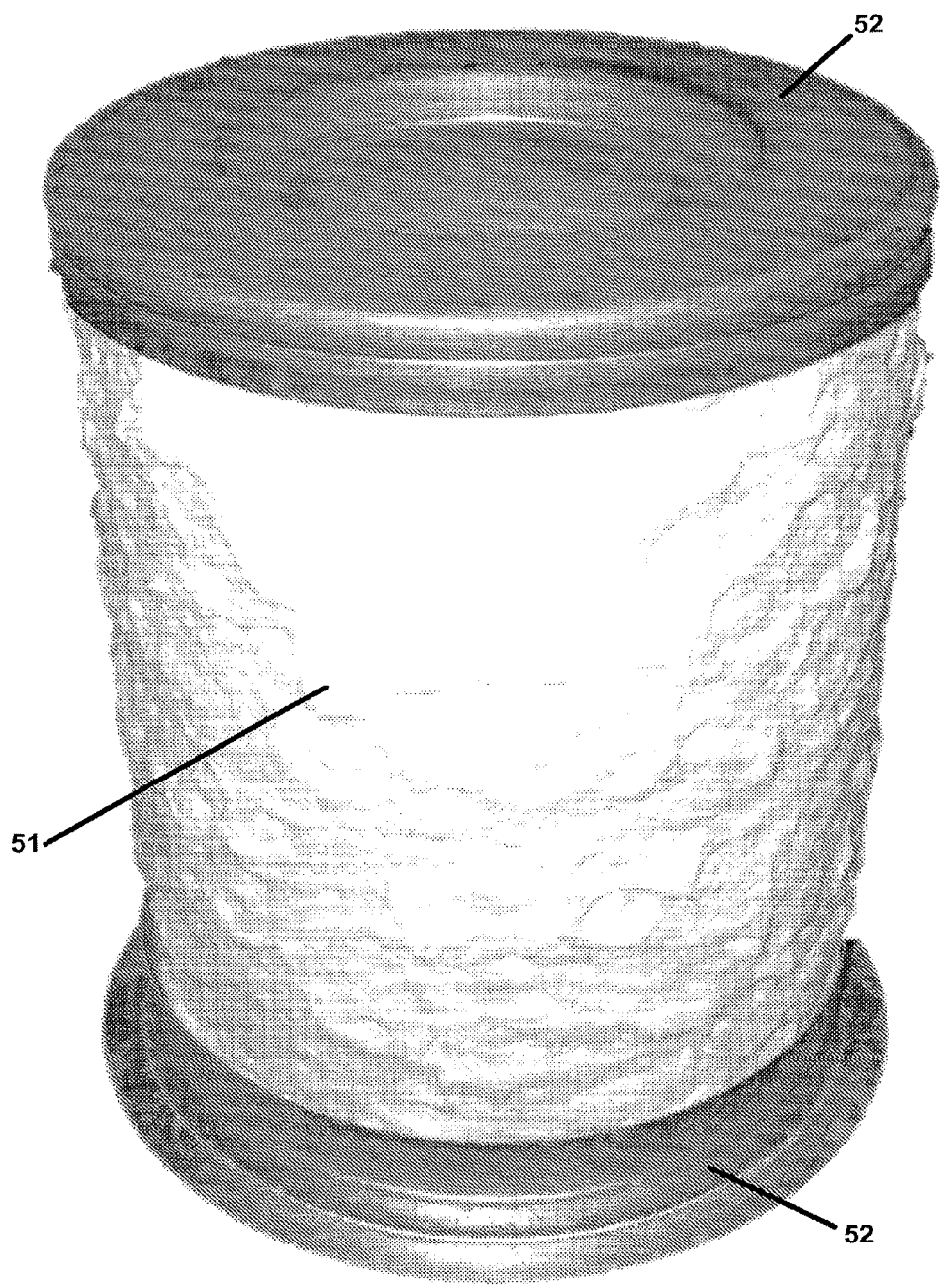
FIGS. 8A and 8B show a fully formed functional coalescer of the invention.
Figure 8B:
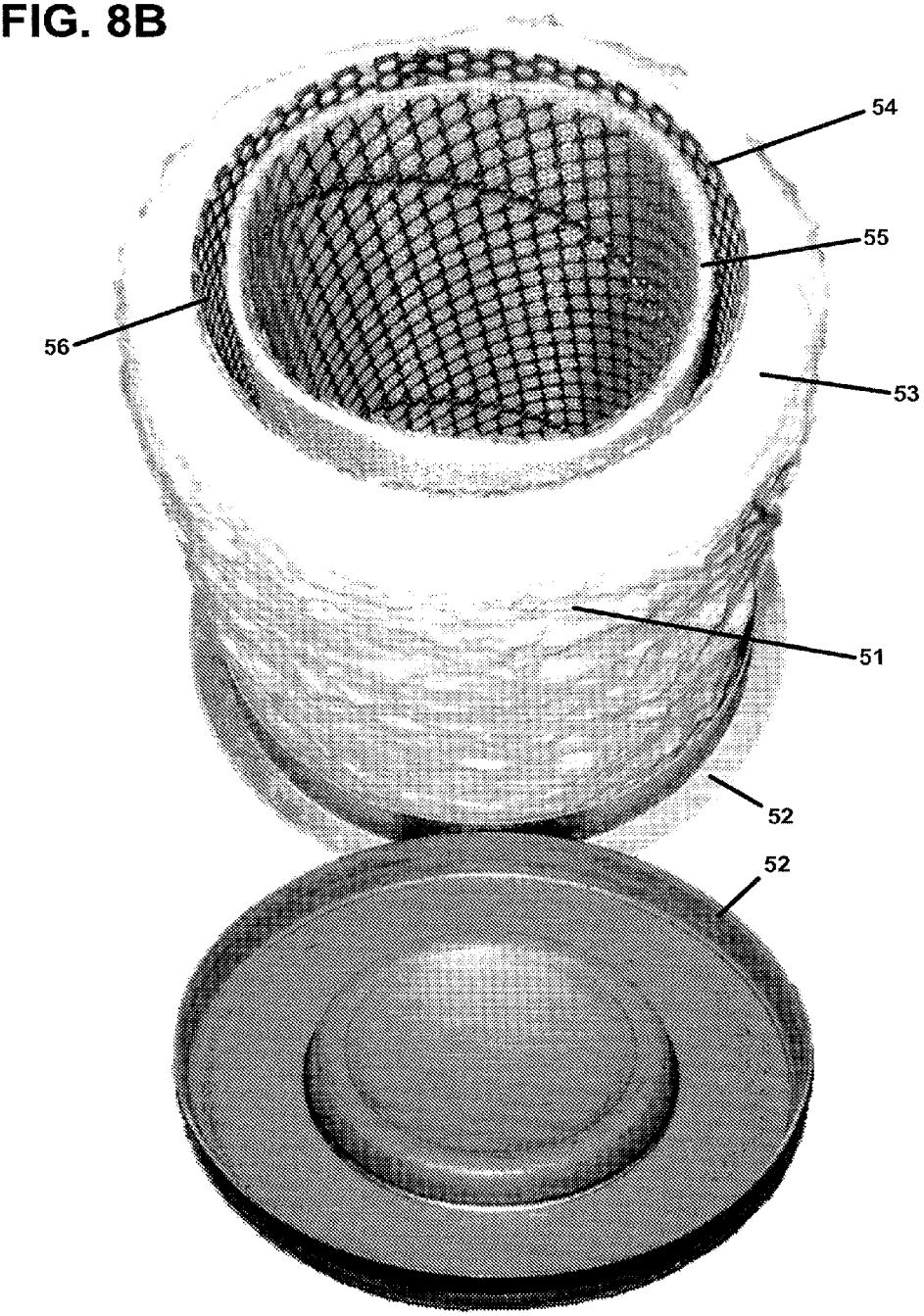

FIGS. 8A and 8B are photographs of filter elements of the present invention which are coalescers made as described in Example 8. FIG. 8A shows a coalescer formed from a filter medium of the present invention, FM-1. FIG. 8a shows coalescer 50, having FM-1 filter medium 51 and endcaps 52. FIG. 8B shows the same coalescer 50, FM-1 medium 51, and endcaps 52. In this view one endcap 52 has been removed to show the internal structure of coalescer 50. Filter medium 51 has substantial thickness 53 and cylindrical apertured support 54, upon which FM-1 filter medium 51 was formed. Also visible is coalescing medium 55 and gap 56 present between support 54 and coalescing medium 55.

The above specification, examples and data provide a complete description of the manufacture and use of the composition of the invention. Since many embodiments of the invention can be made without departing from the spirit and scope of the invention, the invention resides in the claims hereinafter appended. As used in this specification and the appended claims, the singular forms "a", "an" and "the" include single and plural referents unless clearly dictated otherwise by specific specification or claim language. Thus, for example, reference to a composition containing "a compound" includes a mixture of two or more compounds.

Herein when reference is made to efficiency, unless otherwise specified, reference is meant to efficiency when measured according to ASTM-1215-89, with 0.78 g monodisperse polystyrene spherical particles, at 20 fpm (6.1 meters/min) as described herein. However, efficiency may be specified to mean efficiency as measured by the DOP efficiency test which is described in detail below.

EXPERIMENTAL SECTION

General Experimental Techniques

1. Permeability:

As discussed in the examples set forth below, permeability relates to the quantity of air ($ft^3$-$min^{-1}$, or CFM) that will flow through a filter medium at a pressure drop of 0.5 inches of water. In general, permeability as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 available from Advanced Testing Instruments Corp (ATI), 243 East Black Stock Rd. Suite 2, Spartanburg, S.C. 29301, (864)989-0566, www.aticorporation.com.

2. Pore Size:

Pore size means mean flow pore diameter determined using a capillary flow porometer instrument such as a Model APP 1200 AEXSC sold by Porus Materials, Inc., Cornell University Research Park, Bldg. 4.83 Brown Road, Ithaca, new York 14850-1298, 1-800-825-5764, www.pmiapp.com. A sample of filter media is cut to 2.24 cm outer diameter and mounted on a specimen holder. The specimen holder is open at the top and the filter is mounted in the bottom of a well that is 1.90 cm deep. On the underside of the specimen is a chamber open to a path to a manometer, an air bleed needle, and a compressed air source. The air bleed valve is opened and the compressed air turned on to a level whereby the manometer reads 7.6±1.3 cm. The well is filled with reagent grade isopropanol, and the air bleed valve is slowly closed until a bubble appears in the well containing isopropanol. The manometer reading is recorded at the first bubble sighting and the pressure recorded is used to calculate pore size. This measurement is repeated for five repetitions.

3. Filtration Efficiency (DOP) Test:

A 6-inch wide strip of filter media is mounted in the chuck of a TSI 8160 Automated Filter Tester, available from TSI Incorporated of Shoreview, Minn. Dried air is fed with latex particles and this mixture of air and particles is applied at a pressure of 70 psi across the filter media. The face velocity of the air stream is set by adjusting the flow rate of the air/particle mixture as well as the opening size of the chuck. For example, a flow rate of 32 fpm through a chuck size of 100 $cm^2$ will result in a face velocity against the filter sample in the chuck of 5.334 cm/sec (or 10.5 fpm). In this manner, face velocities ranging from 0.35 fpm to 82 fpm may be achieved.

Particle sizes used in the test were 0.03, 0.05, 0.07, 0.09 0.1, 0.2, 0.3, and 0.4 microns in diameter. The concentration of particles in the stream was about 6800 parts per million parts of air flow across the media. The concentration of each particle size in the effluent air is measured, so that the percent of each particle size trapped by the filter at the designated flow rate can be measured. The overall efficiency is the total percent of particles trapped by the filter apparatus. Each particle size is measured, so efficiency as a function of particle size can also be determined.

Example 1

A filter medium of the invention, FM-1, was made using the following technique. Into 250 gallons of untreated tap water was mixed Advansa 271P bicomponent fiber (obtained from EXSA Americas, New York, N.Y.), Evanite #610 glass fiber, and Evanite #608 glass fiber (both obtained from the Evanite Fiber Corporation of Corvallis, Oreg.) such that the relative weight of the components are as shown in Table 1.

Mixing was carried out with a 2 HP rotating paddle mixer for between 30 and 45 minutes to obtain an aqueous slurry of fibers. The slurry was then vacuum formed onto a 5.25"×9" perforated metal cylinder by completely immersing the cylinder in the slurry and holding it under a vacuum of approximately 20 inches Hg for 3-10 seconds.

The formed media was then retracted from the slurry and vacuum was maintained for 15-30 s. The media was removed from the vacuum fixture and placed in a vented oven. The oven temperature was set to 300° C. Residence time in the oven was approximately 35 minutes. The filter media was cooled to room temperature at ambient conditions.

TABLE 1

Components of FM-1

| Component | Wt. (gm) |
|---|---|
| DuPont-271 (14μ) | 1200 |
| Evanite ® glass fiber #610 (2.8μ) | 500 |
| Evanite ® glass fiber #608 (0.8μ) | 200 |

After removing from the oven and cooling, FM-1 was 2.29 cm thick. The basis weight of FM-1 was measured as 2645 grams/meter$^2$ (g/M$^2$). The initial permeability of FM-1 was found to be 1.3 ft/min.

Example 2

A filter medium of the present invention, hereafter referred to as FM-2, was made using the filter making process of Example 1. The components of the filter slurry are shown in Table 2.

TABLE 2

Components of FM-2

| Fibers | Wt. (g) |
|---|---|
| DuPont 271 fiber (14μ) | 980 |
| Evanite ® glass fiber #610 (2.8μ) | 200 |
| Evanite ® glass fiber #608 (0.8μ) | 420 |

After the oven drying step, FM-2 was 0.84 cm thick. FM-2 was found to have a basis weight of 1187 g/M$^2$. The initial air permeability of FM-2 was determined to be 1.4 feet/minute (fpm).

Example 3

A filter medium of the present invention, hereafter referred to as FM-3, was made using the filter making process of Example 1. The components of the filter were bicomponent fibers and carbon particles, added to the slurry at a ratio of approximately 1:1 by weight. The bicomponent fibers were DuPont-271 fibers. The carbon particles were Calgon MD5695, 50-200 mesh activated carbon particles from a coconut powder source, obtained from the Calgon Carbon Company of Pittsburgh, Pa. The particles were mixed directly into the slurry with no prior treatment or washing. After the oven drying step, the filter was analyzed for weight percent of the components. The components of the filter are shown in Table 3. Micrographs of the inside and side views of FM-3 are shown in FIGS. 7e and 7f.

TABLE 3

Components of FM-3

| Component | Wt. % |
|---|---|
| DuPont-271 (14μ) | 49.95 |
| MD5695, 50-200 mesh carbon particles | 50.05 |

The available surface area of the MD5695 particles and the FM-3 filter media containing 50% MD5695 particles were measured using Brunauer-Emmett-Teller (BET) nitrogen adsorption isotherm (BET; see S. Brunauer, P. H. Emmett and E. Teller, *J. Am. Chem. Soc.*, 1938, 60, 309.) Samples were placed in a sampling tube and out-gassed overnight under vacuum at 60° C. The sample was run under standard continuous flow conditions using a Micromeritics ASAP 2010 instrument (available from Micromeritics Corporation of Norcross, Ga.). The following measurements were made:

BET Surface Area: This is the amount of surface area on the molecular level and is measured between relative pressure values of 0.05 and 0.3. It incorporates the concept of multi-molecular layer adsorption.

t-plot Micropore Area: A method to normalize an isotherm and calculate the micropore area with an extrapolation of the linear portion of the adsorption axis.

Total Pore Volume: This is the total pore volume per weight of sample. This is the maximum volume of nitrogen penetrating at the highest pressure applied.

Average Pore Diameter: Model to aid in determining the pore diameter from the wall area and volume. The model assumes that the pores are right cylinders.

The available surface area of the carbon particles alone were compared to the surface area of the particles entrained in FM-3. The results of BET testing are shown in Table 4. The results show that the particles entrained in the filter of the invention did not show a significant decrease in available surface area when incorporated in the filter using the wet-laid technique described above.

TABLE 4

BET results for MD5695 particles and MD5695 particles entrained in FM-3.

| Sample ID | BET Surface Area (m$^2$/g) | Micropore Area (m$^2$/g) | Total Pore Volume (cm$^3$/g) | Average Pore Diameter (Å) |
|---|---|---|---|---|
| MD5695 (Carbon) | 1876 | 668 | 0.942 | 20.1 |
| FM-3 (values are per gram of Carbon) | 1765 | 587 | 0.885 | 20.5 |
| Percent Variation from MD5695 Base Carbon | −6% | −12% | −6% | NA |

Example 4

A filter medium of the present invention, hereafter referred to as FM-4, was made using the filter making process above. The components of the filter were DuPont-271 bicomponent fibers and "media type #3" carbon fibers obtained from CarboPur Technologies, Inc. of Montreal, Quebec, Canada. The carbon fibers are approximately 12-14 micrometers in diameter. These two components were added to the slurry at a ratio of approximately 1:1 by weight. The carbon fibers were mixed directly into the slurry with no prior treatment or washing. After the oven drying step, the filter was analyzed for weight percent of the components and the filter was found to comprise 1:1 bicomponent fibers to carbon fibers by weight.

Example 5

A filter medium of the present invention, hereafter referred to as FM-5, was made using the filter making process of Example 1 above except that the filter was made in two steps using two slurries of differing composition. The first slurry was formed into a layer as described above. This sample also employed Lauscha EC-6, a 6 μm glass fiber, available from the Lauscha Fiber International Corp. of Summerville S.C. The weight of the components of slurry 1 is shown in Table 5 below.

A second layer was added to the first by interrupting the first filter making procedure at the point where the layer would otherwise go into the oven. At this point the support with the first layer was immersed in the second slurry, slurry 2, and the filter making process repeated; the layers were placed in the vented oven as described in Example 1 above. Slurry 2 also differed from the first in that 83 gallons of tap water were used instead of 250 gallons as described in Example 1. The weight of the components of slurry 2 is shown in Table 5.

After the oven drying step, the basis weight of FM-5 was measured to be 1489 g/M$^2$. The Frazier permeability of FM-5 was found to be between 1.35 and 1.5 CFM at 0.5 inches.

TABLE 5

Components of FM-5 slurries

| | Wt. (gm) |
|---|---|
| Slurry 1 Component | |
| DuPont-271 (14μ) | 980 |
| EC-6 Lauscha glass fiber (6 μm) | 420 |
| Slurry 2 Component | |
| DuPont-271 (12μ) | 330 |
| Evanite ® glass fiber #610 (2.8μ) | 66 |
| Evanite ® glass fiber #608 (0.8μ) | 140 |

Example 6

A filter medium of the present invention, hereinafter referred to as FM-6, was made using the same procedure as used in Example 5 to make FM-5, except that two oven drying steps were employed. The first oven drying step was carried out after the first layer of fibers from slurry 1 was applied; the second oven drying step was carried out after the second layer of fibers from slurry 2 was applied. The composition of Layer 1 of FM-6 was determined to be 70% DuPont-271 fibers and 30% Evanite® #610 glass fibers. The composition of Layer 2 of FM-6 was determined to be 71.4 DuPont-271 fibers and 28.6% 3 denier crimped polyester fibers, obtained from Wellman, Inc. of Fort Mill, S.C.

Example 7

DOP efficiency testing was carried out on filter media of the invention and compared to a control filter media sample. The control sample, hereinafter referred to as CONTROL, was a wet laid filter medium using conventional technology to provide a filter media of glass fibers and an aqueous binder material. CONTROL media was obtained from the Donaldson Company of Minneapolis, Minn. under the part number P046257. CONTROL is 1.17 cm thick, has a basis weight of 1526 g/M$^2$, and permeability of 1.5 ft/min.

DOP efficiency was measured at 10.5 fpm flow rate for FM-2, FM-5, and CONTROL. The results are shown in Table 6.

TABLE 6

Results of initial DOP efficiency testing for filter media FM-2, FM-4, and CONTROL.

| Particle Size | EFFICIENCY, % | | |
|---|---|---|---|
| (μm) | FM-2 | FM-5 | CONTROL |
| 0.03 | 99.9999959 | 99.999929 | 99.9997 |
| 0.05 | 99.9999984 | 99.999946 | 99.9939 |
| 0.07 | 99.9999976 | 99.999939 | 99.9913 |
| 0.09 | 99.9999965 | 99.9999 | 99.987 |
| 0.10 | 99.99999966 | 99.999969 | 99.979 |
| 0.20 | 99.9999989 | 99.99987 | 99.97 |
| 0.30 | 99.999986 | 99.99926 | 99.98 |
| 0.40 | 99.999973 | 99.9989 | 99.9916 |

Example 8

FM-1 was incorporated into a functioning oil coalescer for long term testing in an oil coalescing application. A standard polyurethane potting compound, such as any such compounds commonly used in the filtration industry, for example materials sold under the trade name Sentrol® (available from the General Electric Company of Schenectady, N.Y.) or urethane potting products sold by the Epoxies, Etc. of Cranston, R.I. or PottingSolutions Company of Aurora, Colo., was applied into an open (top) end cap part. A coalescing media, such as media sold under the trade name PERFORMAX® (available from the NATCO Group, Inc. of Houston, Tex.) or the trade name Q-PAC® (available from Lantec Products, Inc. of Agoura Hills, Calif.) that has been encapsulated in between two expanded metal screens was inserted into the end cap. The vacuum formed filter media FM-1 was inserted into the end cap, assuring a gap of approximately ¼ inch exists between the coalescing media and the vacuum formed filter media.

The potting compound was activated by heating in an oven according to manufacturers specifications, to secure the two concentric media packs. After activation, the partially formed functioning coalescers were allowed to cool to ambient temperature.

Polyurethane potting compound was then applied to the closed (bottom) end cap, and the partially formed functioning coalescers were inserted into the closed end cap, such that the concentric media packs were positioned to maintain the ¼ inch gap. The newly applied potting compound was activated by heating in an oven according to manufacturers specifications, to secure the fully formed functioning coalescers. After activation, the functioning coalescers were allowed to cool to ambient temperature. FIG. 8 shows a fully formed functioning coalescer made using FM-1.

In the same manner, CONTROL was formed into a functioning coalescer prior to further testing.

Example 9

The functioning coalescers made from vacuum formed media FM-1 and CONTROL samples, as described in Example 7, were subjected to long-term testing by mounting the coalescers into a Sullair LS-10 industrial air compressor (available from the Sullair Company of Michigan City, Ind.) and running the compressor at discharge pressures of 60 psi and 100 psi over an 8000 hour period. Discharge temperature was measured periodically over the duration of the test. Additionally, during the test each sample was periodically removed from the compressor and tested for oil carryover, pressure drop across the filter, corrected air flow as determined by discharge pressure of the effluent air, and DOP efficiency. The results from the 8000 hour test are shown for FM-1 in Table 7, and for CONTROL in Table 8. The results of oil carryover, pressure drop, and corrected flow for FM-1 and CONTROL, as well as discharge temperature for FM-1, are graphically represented in FIGS. 2-5, respectively.

The results show that FM-1 had superior properties of oil retention, as oil carryover was significantly less than for CONTROL; that FM-1 had similar pressure drop to CONTROL, even though it entrapped more oil than did CONTROL; and the corrected flow was essentially unchanged for FM-1 throughout the 8000 hour test; and that FM-1 had acceptable discharge temperature over the duration of the test.

TABLE 7

Test results for long-term oil compressor use of FM-1.

| Time, hr | Oil Carryover, ppm | Pressure Drop, psid | Applied Pressure, psi | Corrected Flow, CFM | Discharge Temp., °C. |
|---|---|---|---|---|---|
| 320 | 0.7 | 1.8 | 100 | 128.2 | 88 |
| 512 | 1.0 | 1.8 | 100 | 131.6 | 88 |
| 691 | 1.2 | 2.1 | 100 | 129.9 | 93 |
| 853 | 1.2 | 2.1 | 100 | 131.5 | 88 |
| 990 | 1.3 | 2.2 | 100 | 131.2 | 89 |
| 1163 | 1.5 | 2.2 | 100 | 130.7 | 89 |
| 1366 | 1.6 | 2.4 | 100 | 130.3 | 88 |
| 1554 | 1.8 | 2.3 | 100 | 137.5 | 88 |
| 1754 | 1.7 | 2.4 | 100 | 136.0 | 89 |
| 1918 | 1.6 | 2.5 | 100 | 139.5 | 82 |
| 2112 | 1.6 | 2.4 | 100 | 134.1 | 89 |
| 2322 | 1.5 | 2.4 | 100 | 137.0 | 88 |
| 2542 | 1.6 | 2.5 | 100 | 139.0 | 85 |
| 2729 | 1.4 | 2.7 | 100 | 137.0 | 85 |
| 2900 | 1.4 | 2.7 | 100 | 137.0 | 82 |
| 3069 | 1.3 | 2.6 | 100 | 137.0 | 82 |
| 3144 | 1.5 | 2.7 | 100 | 137.0 | 82 |
| 3262 | 2.1 | 2.7 | 100 | 135.0 | 85 |
| 3449 | 1.7 | 2.7 | 100 | 136.0 | 85 |
| 3589 | 1.7 | 2.6 | 100 | 136.0 | 87 |
| 3757 | 1.7 | 2.6 | 100 | 136.0 | 88 |
| 3920 | 1.6 | 2.7 | 100 | 137.0 | 85 |
| 4110 | 1.6 | 2.6 | 100 | 134.0 | 87 |
| 4373 | 1.2 | 3.2 | 60 | 133.0 | 86 |
| 4553 | 1.2 | 3.2 | 60 | 131.0 | 82 |
| 4764 | 1.2 | 3.2 | 60 | 131.0 | 83 |
| 4954 | 1.1 | 3.0 | 60 | 131.0 | 84 |
| 5210 | 1.4 | 2.9 | 60 | 128.1 | 82 |
| 5447 | 1.0 | 3.3 | 60 | 129.0 | 82 |
| 5945 | 1.0 | 3.0 | 60 | 125.0 | 82 |
| 6203 | 1.7 | 2.6 | 100 | 136.0 | 96 |
| 6367 | 1.5 | 2.7 | 100 | 131.0 | 99 |
| 6552 | 1.4 | 2.7 | 100 | 132.0 | 94 |
| 6724 | 1.6 | 2.7 | 100 | 130.0 | 100 |
| 6900 | 2.5 | 2.5 | 100 | 131.0 | 101 |
| 6977 | 1.4 | 2.5 | 100 | 132.0 | 99 |
| 7169 | 1.7 | 2.5 | 100 | 132.0 | 97 |
| 7310 | 1.9 | 2.7 | 100 | 129.0 | 100 |
| 7422 | 1.7 | 2.8 | 100 | 135.0 | 91 |
| 7591 | 1.6 | 2.7 | 100 | 131.0 | 100 |
| 7732 | 3.0 | 2.9 | 100 | 132.0 | 100 |
| 7894 | 1.8 | 2.8 | 100 | 133.0 | 98 |
| 8049 | 1.8 | 2.8 | 100 | 134.0 | 98 |

TABLE 8

Test results for long-term oil compressor use of CONTROL.

| Time, hr | Oil Carryover, ppm | Pressure Drop, psid | Applied Pressure, psi | Corrected Flow, CFM | Discharge Temp., °C. |
|---|---|---|---|---|---|
| 123 | 0.9 | 1.3 | 100 | 133.5 | 92 |
| 406 | 0.6 | 1.7 | 100 | 136.4 | 93 |
| 555 | 1.8 | 1.6 | 100 | 134.6 | 91 |
| 716 | 2.0 | 1.8 | 100 | 136.4 | 93 |
| 1325 | 1.8 | 1.5 | 100 | 136.9 | 93 |
| 1660 | 1.7 | 1.6 | 101 | 139.4 | 86 |
| 2327 | 1.7 |  | 102 | 139.6 | 93 |
| 2931 | 1.6 |  | 102 | 140.1 | 84 |
| 3098 | 1.6 |  | 103 | 140.9 | 84 |
| 332 | 2.4 | 2.0 | 100 | 130.6 | 90 |
| 451 | 2.1 | 1.7 | 100 | 135.7 | 90 |
| 613 | 2.1 | 1.7 | 100 | 135.9 | 89 |
| 920 | 2.3 | 1.8 | 100 | 136.9 | 91 |
| 1110 | 3.0 | 2.4 | 60 | 144.2 | 85 |
| 1477 | 2.5 | 2.4 | 60 | 148.9 | 81 |
| 1804 | 3.2 | 2.6 | 60 | 147.1 | 84 |
| 1994 | 3.0 | 2.6 | 60 | 152.5 | 88 |
| 5336 | 5.4 | 2.0 | 100 | 136.5 | 82 |
| 5454 | 6.9 | 2.0 | 100 | 135.4 | 88 |
| 5621 | 5.2 | 2.0 | 100 | 133.3 | 99 |
| 5717 | 6.5 | 2.0 | 100 | 133.3 | 94 |
| 5911 | 4.4 | 2.0 | 100 | 135.0 | 90 |
| 6064 | 6.3 | 2.1 | 100 | 134.6 | 91 |
| 6131 | 6.7 | 2.2 | 100 | 135.0 | 97 |
| 6270 | 6.6 | 2.3 | 100 | 137.2 | 88 |
| 6431 | 6.6 | 2.0 | 100 | 137.2 | 88 |
| 6579 | 6.3 | 2.1 | 100 | 136.1 | 93 |
| 6886 | 5.9 | 2.2 | 100 | 137.0 | 89 |
| 7170 | 5.6 | 2.2 | 100 | 138.4 | 91 |
| 7289 | 5.1 | 2.2 | 100 | 138.2 | 88 |
| 7646 | 3.8 | 2.4 | 100 | 136.3 | 85 |
| 8024 | 4.9 | 2.3 | 100 | 134.6 | 96 |

Example 10

Mechanical properties were measured for FM-1 and CONTROL using 1.27 cm thick samples of each filter medium. Burst strength was measured for FM-1 and CONTROL using a TMI Monitor Burst 200 Mullen Burst Tester (available from the Standex Engraving Group of Chicopee, Mass.), in compliance with TAPPI T403 and ASTM D774 specifications. The burst strength of CONTROL was measured to be 14-20 psi. The burst strength of FM-1 was measured to be 37-49 psid.

Stress-strain properties of the filter media of the present invention were measured using a Sintech Model M3000 W tester, available from the MTS Systems Corporation of Eden Prairie, Minn. Stress-strain properties were measured using a 200 lb load cell and a strain rate of 1 inch/min until break. Samples were cut using a dog-bone shape die with neck proportion of 1.5 inches×0.5 inches. All samples were tested in the axial direction, cross-machine direction, and 45 degrees from machine direction. Unless noted, no differences were observed among the samples cut in different directions.

The elongation at break was 0.44% for CONTROL, while the elongation at break for FM-1 was 10.97%. The tensile strength was determined to be 94.3 psi for CONTROL and 130.5 psi for FM-1. The results of the tensile test are shown in FIG. 6. It can be observed that FM-1 has a greater elongation at break as well as superior tensile strength when compared to CONTROL. This result shows the effect on physical properties of using bicomponent fibers instead of the traditional binder resins of the prior art to bind glass fibers in the filter medium.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with known or customary practice within the art to which the invention pertains and as may be applied to the essential features hereinbefore set forth and as follows in scope of the appended claims.

What is claimed is:

1. A process of forming a filter element comprising a formed filter medium, the process comprising:
    blending an aqueous slurry comprising a bicomponent fiber and a glass fiber;
    immersing a perforate support in the aqueous slurry, wherein the perforate support is suitably open to allow the passage of water while depositing fibers onto the perforate support;
    applying a vacuum across the perforate support for a period of time sufficient to form a wet layer of fibers on the perforate support;
    removing the perforate support having the wet layer formed thereon from the aqueous slurry;
    extracting water from the wet layer to form a perforate support having a fibrous filter layer formed thereon; and
    heating the perforate support having the fibrous filter layer formed thereon to a temperature sufficient to melt one component of the bicomponent fiber, to form a filter element comprising the perforate support having a formed filter medium disposed thereon, wherein the formed filter medium has a basis weight of at least about 500 grams/meter$^2$;
    wherein the process further comprises adding an additive to the aqueous slurry or to the formed filter medium, the additive comprising a surface finish compound, a compound to change the surface energy of one or more fibers, an acid, a base, a fluorocarbon, a flame retardant compound, an antistatic compound, or a combination thereof.

2. The process of claim 1 wherein the fibers are substantially dried during the heating step.

3. The process of claim 1 wherein the formed filter medium comprises about 20 to 95 wt % inclusive of a bicomponent fiber; and about 80 to 5 wt % inclusive of a glass fiber.

4. The process of claim 3 wherein the glass fiber has a diameter of about 0.1 to 8.0 microns inclusive and aspect ratio of greater than about 1:100.

5. The process of claim 3 wherein the glass fiber comprises a first glass fiber having a diameter of about 0.1 to 8.0 microns inclusive and a second glass fiber having a fiber diameter of about 8.0 to 13.0 microns inclusive.

6. The process of claim 3 wherein the glass fiber comprises a first glass fiber having a diameter of about 0.1 to 2.0 microns inclusive and a second glass fiber having a fiber diameter of about 2.6 to 8.0 microns inclusive.

7. The process of claim 1 wherein the filter medium after the heating step has a basis weight of up to about 3,000 grams/meter$^2$.

8. The process of claim 7 wherein the filter medium after the heating step has a thickness greater than about 5 centimeters basis weight of about 2,500 grams/meter$^2$ to about 3,000 grams/meter$^2$.

9. The process of claim 1 wherein the bicomponent fiber has a diameter of about 5 to 50 micrometers inclusive and a length of about 0.1 to 20 millimeters inclusive.

10. The process of claim 1 wherein the bicomponent fiber comprises a core material disposed within a sheath material, the core material having a melting point of about 200° C. to 260° C. inclusive and the sheath material having a melting point of about 80° C. to 200° C. inclusive.

11. The process of claim 10 wherein the bicomponent fiber sheath material comprises a polyolefin, a polyester, a polyvinyl acetate, a polyvinyl chloride, a polyvinyl butyral, an acrylic resin, a polyamide, a polyvinylidene chloride, a polystyrene, a polyvinyl alcohol, a polyurethane, a cellulosic resin, a styrene-butadiene copolymer, an acrylonitrilebutadiene-styrene copolymer, a styrenic block copolymer, a polyisoprene rubber, or a copolymer or a mixture thereof.

12. The process of claim 1, further comprising adding a binder to the slurry.

13. The process of claim 12 wherein the binder is a latex binder, the latex binder comprising an acrylic, an ethylene vinyl acetate, a polyvinyl alcohol, an ethylene vinyl alcohol, a polyvinyl pyrrolidone, a polyvinyl chloride, or a copolymer or a blend thereof.

14. The process of claim 12 wherein the binder is solvent borne, the binder comprising a phenolic resin, a polyvinyl acetate, a polyvinyl alcohol, an acrylic resin, a methacrylic resin, a polyurethane, a polycyanoacrylate, an epoxy, a melamine resin, a polycaprolactone, or a copolymer or blend thereof.

15. The process of claim 1 wherein the aqueous slurry further comprises a thermoplastic fiber, the thermoplastic fiber comprising a polyester, a polyamide, a polypropylene, a copolyetherester, a polyethylene terephthalate, a polybutylene terephthalate, a polyetherketoneketone, a polyetheretherketone, a liquid crystalline polymer, and mixtures thereof.

16. The process of claim 15 wherein the thermoplastic fiber comprises a polyester comprising poly(ethylene terephthalate).

17. The process of claim 1 further comprising adding an antioxidant, a stabilizer, a lubricant, a toughener, a dispersing aid, a surface active agent, an acid, a catalyst, or a mixture thereof to the aqueous slurry.

18. The process of claim 1 further comprising adding an inorganic fiber to the aqueous slurry, the inorganic fiber comprising a carbon, a metal, a metal oxide, or a combination thereof.

19. The process of claim 1 further comprising adding a fiber to the aqueous slurry, the fiber comprising one or more naturally occurring cotton, linen, wool, cellulosic or proteinaceous polymers.

20. The process of claim 1 further comprising adding a particulate to the aqueous slurry, the particulate comprising a metal oxide, a metal, a ceramic, a zeolite, a carbon, an ion exchange resin, a nanotube, or a mixture thereof.

21. The process of claim 20 wherein the particulate comprises activated charcoal.

22. The process of claim 20 wherein the particulate has an average particle size of 3 millimeters or less.

23. The process of claim 1 wherein the additive is added to the formed filter medium by means of dipping the filter medium in a solvent having the additive dispersed therein.

24. The process of claim 1 wherein the additive is added to the formed filter medium by a spraying means.

25. The process of claim 1 wherein a vacuum of 10 to 29 inches Hg is applied for between 2 and 35 seconds.

26. The process of claim 1 wherein the vacuum is maintained for 15 to 30 seconds during extracting after the removing and before the heating.

27. The process of claim 1 wherein the heating is accomplished in a through-air drying oven.

28. The process of claim 1 wherein the perforate support is cylindrical, pleated cylindrical, conical, or oval.

29. A process of forming a filtration assembly, the process comprising adding one or more endcaps, housings, or a combination thereof to the filter element made by the process of claim 1.

30. A process of forming a filter element comprising a formed filter medium, the process comprising:
  blending an aqueous slurry comprising a glass fiber and a bicomponent fiber comprising a binder component;
  immersing a perforate support in the aqueous slurry, wherein the perforate support is suitably open to allow the passage of water while depositing fibers onto the perforate support;
  applying a vacuum across the perforate support for a period of time sufficient to form a wet layer of fibers on the perforate support;
  removing the perforate support having the wet layer formed thereon from the aqueous slurry;
  extracting water from the wet layer to form a perforate support having a fibrous filter layer formed thereon; and
  heating the perforate support having the fibrous filter layer formed thereon to a temperature sufficient to melt the binder component of the bicomponent fiber, to form a filter element comprising the perforate support having a formed filter medium disposed thereon;
  wherein the formed filter medium has a basis weight of about 500 grams/meter$^2$ to 3,000 grams/meter$^2$; and
  wherein the filter element does not include a binder other than the binder component of the bicomponent binder fibers.

31. The process of claim 30 further comprising adding an additive to the formed filter medium, the additive comprising a surface finish compound, a compound to change the surface energy of one or more fibers, an acid, a base, a fluorocarbon, a flame retardant compound, a catalyst, an antistatic compound, or a combination thereof.

32. The process of claim 31 wherein the additive is added by means of dipping the filter medium in a solvent having the additive dispersed therein.

33. The process of claim 31 wherein the additive is added by a spraying means.

34. The process of claim 30 further comprising adding an additive to the aqueous slurry, the additive comprising a surface finish compound, a compound to change the surface energy of one or more fibers, an acid, a base, a fluorocarbon, a flame retardant compound, a catalyst, an antistatic compound, or a combination thereof.

35. A process of forming a filter element comprising a formed filter medium, the process comprising:
  blending a first aqueous slurry comprising a bicomponent fiber and a glass fiber;
  immersing a perforate support in the first aqueous slurry, wherein the perforate support is suitably open to allow the passage of water while depositing fibers onto the perforate support;
  applying a vacuum across the perforate support for a period of time sufficient to form a first wet layer of fibers on the perforate support;
  removing the perforate support having the first wet layer formed thereon from the aqueous slurry;
  vacuum drying the perforate support having the first wet layer formed thereon to form a first dry media layer;
  optionally heating the perforate support having the first dry media layer formed thereon to a temperature sufficient to melt one component of the bicomponent fiber;
  blending a second aqueous slurry that is different from the first aqueous slurry;
  immersing into the second aqueous slurry the perforate support having the first dry media layer, which is optionally heated to melt one component of the bicomponent fiber;
  applying a vacuum across the perforate support for a period of time sufficient to form a second wet layer of fibers on the first dry media layer; and
  removing the formed filter medium and second wet layer from the aqueous slurry;
  vacuum drying the perforate support having the second wet layer formed thereon to form a second dry media layer;
  heating the perforate support having the first and second dry media layers formed thereon to a temperature sufficient to melt one component of the bicomponent fiber, to form a filter element comprising the perforate support having a formed filter medium disposed thereon, wherein the formed filter medium has a basis weight of at least about 500 grams/meter$^2$.

36. The process of claim 35 further comprising adding an additive to the formed filter medium, the additive comprising a surface finish compound, a compound to change the surface energy of one or more fibers, an acid, a base, a fluorocarbon, a flame retardant compound, an antistatic compound, or a combination thereof.

37. The process of claim 36 wherein the additive is added by means of dipping the filter medium in a solvent having the additive dispersed therein.

38. The process of claim 36 wherein the additive is added by a spraying means.

39. The process of claim 35 further comprising adding an additive to the first and/or the second aqueous slurries, the additive comprising a surface finish compound, a compound to change the surface energy of one or more fibers, an acid, a base, a fluorocarbon, a flame retardant compound, an antistatic compound, or a combination thereof.

* * * * *